United States Patent
Tan

(10) Patent No.: US 9,009,510 B2
(45) Date of Patent: Apr. 14, 2015

(54) METHOD FOR POWER SAVING DURING STANDBY MODE IN THE PHYSICAL LAYER BLOCK FOR THE SERIAL DATA COMMUNICATION INTERFACE

(71) Applicant: Renesas Electronics Corporation, Kawasaki-shi (JP)

(72) Inventor: Kenzo Tan, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 276 days.

(21) Appl. No.: 13/737,803

(22) Filed: Jan. 9, 2013

(65) Prior Publication Data
US 2013/0185578 A1 Jul. 18, 2013

(30) Foreign Application Priority Data
Jan. 13, 2012 (JP) .................................. 2012-005579

(51) Int. Cl.
*G06F 1/32* (2006.01)
(52) U.S. Cl.
CPC ............ *G06F 1/3234* (2013.01); *G06F 1/3278* (2013.01); *Y02B 60/126* (2013.01)
(58) Field of Classification Search
USPC ......................................................... 713/323
See application file for complete search history.

(56) References Cited

U.S. PATENT DOCUMENTS

| | | | |
|---|---|---|---|
| 6,230,277 B1 | 5/2001 | Nakaoka et al. | |
| 8,762,748 B1 * | 6/2014 | Zhang ........................... | 713/300 |
| 2005/0076254 A1 * | 4/2005 | Robinson et al. ............. | 713/320 |
| 2011/0296215 A1 * | 12/2011 | Mobin et al. .................. | 713/323 |
| 2013/0145191 A1 * | 6/2013 | Hung et al. .................... | 713/323 |
| 2013/0159749 A1 * | 6/2013 | Moeglein et al. ............. | 713/323 |
| 2014/0173303 A1 * | 6/2014 | Chen et al. .................... | 713/310 |

FOREIGN PATENT DOCUMENTS

JP 2000-284867 A 10/2000

* cited by examiner

*Primary Examiner* — Vincent Tran
(74) *Attorney, Agent, or Firm* — McGinn IP Law Group, PLLC

(57) ABSTRACT

A semiconductor device includes a detector that receives an input signal whose characteristics fluctuate depend on the standby mode state, compares the input signal amplitude with a specific threshold amplitude, and outputs a detector output signal that shows whether or not the amplitude of the applicable input signal is above the specified threshold amplitude; and an intermittent operation control circuit that along with receiving the detector output, also receives a first signal showing which mode among the multiple standby mode states is in, and sets the detector to the continuously on (enable) mode state when the input signal is above the specified threshold amplitude, and in all other cases intermittently operates the detector depend on the characteristics of the input signal in the mode shown by the first signal.

16 Claims, 26 Drawing Sheets

FIG. 1

Table C-1. Link States and Characteristics Summary

| Link State | Description | Characteristics | State Transition Initiator | Device Clock Gen On/Off | Typical Exit Latency Range |
|---|---|---|---|---|---|
| U0 | Link active | Link operation state | N/A | On | N/A |
| U1 | Link idle-fast exit | Rx and Tx circuitry quiesced | Hardware[1] | On or Off | $\mu$s |
| U2 | Link idle-slower exit | Clock generation circuitry may additionally be quiesced | Hardware[1] | On or Off[2] | $\mu$s-ms |
| U3 | Link suspend | Interface (e.g., Physical Layer) power may be removed | Entry: Software only Exit: Hardware or Software | Off | ms |

FIG. 11

INTERMITTENT OPERATION CONTROL CIRCUIT TRUTH TABLE

| INPUT SIGNALS | | INTERNAL SIGNALS | OUTPUT SIGNALS | OPERATION MODE |
|---|---|---|---|---|
| INTERMITTENT OPERATION MODE SETUP SIGNAL | LFPS DETECTOR OUTPUT (=LATCH OUTPUT) | OR OUTPUT (SELECT SIGNAL) | SELECTOR OUTPUT | |
| 0 | 0 | 0 | COUNTER OUTPUT | INTERMITTENT OPERATION |
| 0 | 1 | 1 | 1 | NORMAL OPERATION (ALWAYS ENABLE) |
| 1 | 0 | | | |
| 1 | 1 | | | |

FIG. 20

Table 6-21. LFPS Transmitter Timing[1]

|  | tBurst | | | Minimum Number of LFPS Cycles[2] | tRepeat | | |
|---|---|---|---|---|---|---|---|
|  | Min | Typ | Max |  | Min | Typ | Max |
| Polling.LFPS | 0.6 $\mu$s | 1.0 $\mu$s | 1.4 $\mu$s |  | 6 $\mu$s | 10 $\mu$s | 14 $\mu$s |
| Ping.LFPS | 40 ns |  | 200 ns | 2 | 160 ms | 200 ms | 240 ms |
| tReset[3] | 80 ms | 100 ms | 120 ms |  |  |  |  |
| U1 Exit[4,5] | 300 ns |  | 900 ns/2 ms[6] |  |  |  |  |
| U2 / Loopback Exit[4,5] | 80 $\mu$s[7] |  | 2 ms |  |  |  |  |
| U3 Wakeup[4,5] | 80 $\mu$s[7] |  | 10 ms |  |  |  |  |

METHOD FOR POWER SAVING DURING STANDBY MODE IN THE PHYSICAL LAYER BLOCK FOR THE SERIAL DATA COMMUNICATION INTERFACE

CROSS-REFERENCE TO RELATED APPLICATIONS

The disclosure of Japanese Patent Application No. 2012-005579 filed on Jan. 13, 2012 including the specification, drawings and abstract is incorporated herein by reference in its entirety.

BACKGROUND

The present invention relates to a semiconductor device and control method, and relates in particular to power reduction during standby mode in the physical layer block for the serial data communication interface and power reduction in the standby mode state in the physical layer block conforming to USB 3.0 standards.

There are steadily increasing demands for reducing power in products centering on portable devices. Lowering power consumption during normal operation and standby mode operation is also important in the development of the physical layers of serial data communication interfaces.

FIG. 1 is a drawing showing the characteristics of the link states (U0 mode through U3 mode) in USB 3.0. Referring to FIG. 1 shows that the link states in the USB.3.0 standards are grouped into a normal mode state (U0 mode) and multiple standby mode states (U1 mode-U3 mode) and that fine power control is specified for each state. The power in particular in the standby mode state in U3 mode requires an average current of 2.5 mA or less.

In power regulation in USB 3.0, low power consumption during standby mode is achieved by stopping operation of all unnecessary circuit blocks depend on each standby mode state.

As shown in FIG. 2, a LFPS (Low Frequency Periodic Signaling) signal is utilized between the USB 3.0 A (host) 100 and the USB 3.0 B (device) 200 connected in 1-to-1 relationship to implement recovery operation from standby mode state (U1 mode-U3 mode) to the normal mode state (U0 mode).

FIG. 3 is a diagram of the signal exchange between the host 100 and the device 200 during recovery from the standby mode state. The LFPS signal is also sent from the opponent during standby mode. The LFPS detector must therefore be operating even when in standby mode state in order to constantly monitor the LFPS signals sent from the opponent.

The frequency of the LFPS signal is 10 to 50 MHz which is a frequency much lower than the data transfer speed of 5 Gbps during normal mode operation in USB 3.0. The LFPS detector can therefore achieve relatively low power consumption. However, achieving accuracy between 100-300 mV as the standard for the amplitude detection threshold of the LFPS signal requires contriving an LFPS detector for detecting LFPS signals as shown in the circuit example in FIG. 4 by utilizing current mode logic (CML) type circuits. Reducing the current consumption in the detector to zero is therefore impossible.

Moreover, when there are multiple USB 3.0 lanes, then setting the average current below 2.5 mA during standby mode in U3 mode at the device level requires drastically reducing the power by cutting power consumption in the physical layer block containing the LFPS detector. Also when lowering the power consumption in standby mode state in devices conforming to USB 3.0 standards, then low power consumption must be attained while maintaining the detection threshold accuracy of the LFPS circuit.

Technology for monitoring signals at minimal power consumption is disclosed for example in Japanese Unexamined Patent application Publication No. 2000-284867 in which a USB device contains an infrared communication module, and a microcomputer intermittently (periodically) operates the infrared module for a specified period during standby mode so that the infrared signal is monitored at minimal power consumption and the infrared module is returned to the normally active state when an infrared signal is detected.

SUMMARY

The invention rendered by the present inventors is analyzed as follows.

FIG. 5 is a block diagram showing one example of the structure of a semiconductor device of the related art. Examining FIG. 5 shows that the semiconductor device is comprised of a data receiver 101, and LFPS detector 102, an oscillator 104, and a transmitter 105.

The LFPS detector 102 designed especially for receiving LFPS signals at low power consumption is mounted separately from the data receiver 101 that receives 5 Gbps signals during normal operation. During standby mode, low power consumption is achieved by operating only those blocks (the oscillator 104 supplying low-speed clocks to the link layer) required during standby mode operation besides the LFPS detector 102. The frequency of the LFPS signal is 10 to 50 MHz which is a frequency lower than the 5 Gbps data transfer speed during normal operation in USB 3.0 so the power consumption in the LFPS detector 102 serving as the LFPS dedicated receiver can be lowered.

However even if the LFPS detector 102 is designed for low power consumption, the LFPS detector 102 requires a steady-state current in order to achieve an accuracy of 100-300 mV as the detection threshold standard so achieving a circuit at zero current is impossible. In a device containing multiple USB 3.0 lanes such as HUB for example, operating the device below 2.5 mA of the average current in U3 mode is impossible so that lowering the power consumption is necessary while maintaining the accuracy of the detection threshold in the LFPS detector 102.

Whereupon intermittently operating the LFPS detector 102 as disclosed in Japanese Unexamined Patent application Publication No. 2000-284867 was considered. However the characteristics of the input LFPS signal fluctuate in the standby mode state in USB 3.0. So simply intermittently operating the LFPS detector at a specified period the same as in Japanese Unexamined Patent application Publication No. 2000-284867 will not provide satisfactory performance conforming to the LFPS signal characteristics in the period that the LFPS detector is in the on (enable) mode state. For example if the gap for the period that the LFPS detector is in the on (enable) mode state is too short relative to the LFPS signal characteristics, then the LFPS detector will waste electrical power and conversely if the gap for the period that the LFPS detector is in the on (enable) mode state is too long, then the problem occurs that the LFPS signal is not detected.

So when signal characteristics that must be monitored in standby mode state are fluctuating in each mode's standby mode state, the issue becomes being able to detect the applicable signal at minimal power consumption.

According to a first aspect of the present invention, a semiconductor device includes: a detector to receive an input signal whose characteristics fluctuate depend on the standby mode state, compare the amplitude of the applicable input signal with a specified threshold amplitude, and output a detector, output showing whether or not the amplitude of the applicable input signal is above a specified threshold amplitude; and an intermittent operation control circuit that along with receiving the detection signal (detector output), also receives a first signal showing which mode among the plural modes the standby mode state is in, and when the input signal is above the specified threshold amplitude sets the detector to the continuously operation state and in all other cases intermittently operates the detector depend on the characteristics of the input signal in the mode showing the applicable first signal.

According to a second aspect of the present invention, a control method for a semiconductor device including: comparing the amplitude of an input signal whose characteristics fluctuate depend on the standby mode state with a specified threshold amplitude, and deciding by way of the detector whether or not the amplitude of the applicable input signal is above a specified threshold amplitude; receiving a first signal showing which mode among the plural modes the standby mode state is in, and a step of setting the detector to the continuously on(enable) mode state when the input signal is above the specified threshold amplitude; and intermittently operating the detector depend on the characteristics of the input signal in the mode showing the first signal in all other cases.

The semiconductor device and control method of the present invention are capable of detecting a signal at minimal power consumption when the characteristics of the applicable signal for monitoring in standby mode state are fluctuating depend on the standby mode state.

BRIEF DESCRIPTION OF THE DRAWINGS

FIG. 1 is a drawing showing the characteristics of the link states (U0 mode through U3 mode) in USB 3.0;

FIG. 11 is a truth table showing the operation of the intermittent operation control circuit operation for the semiconductor device of the first embodiment;

FIG. 20 is a table showing the transmit timing of the LFPS signal specified in USB 3.0;

DETAILED DESCRIPTION OF THE PREFERRED EMBODIMENTS

Figure 2:
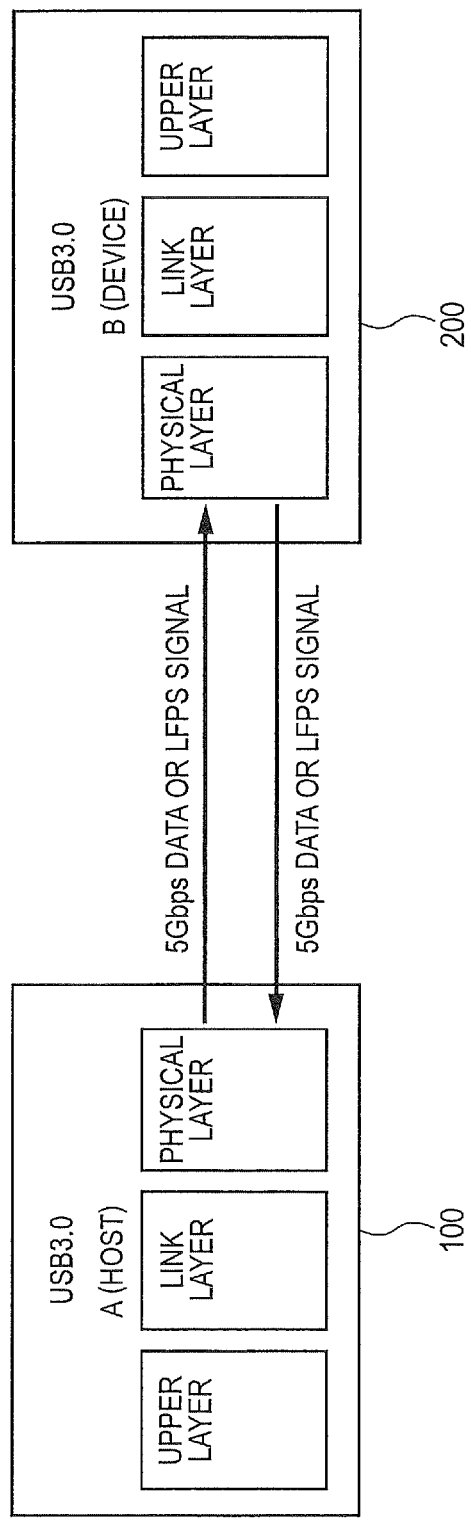
FIG. 2 is a drawing showing the connection between the host and device conforming to USB 3.0.
Figure 3:
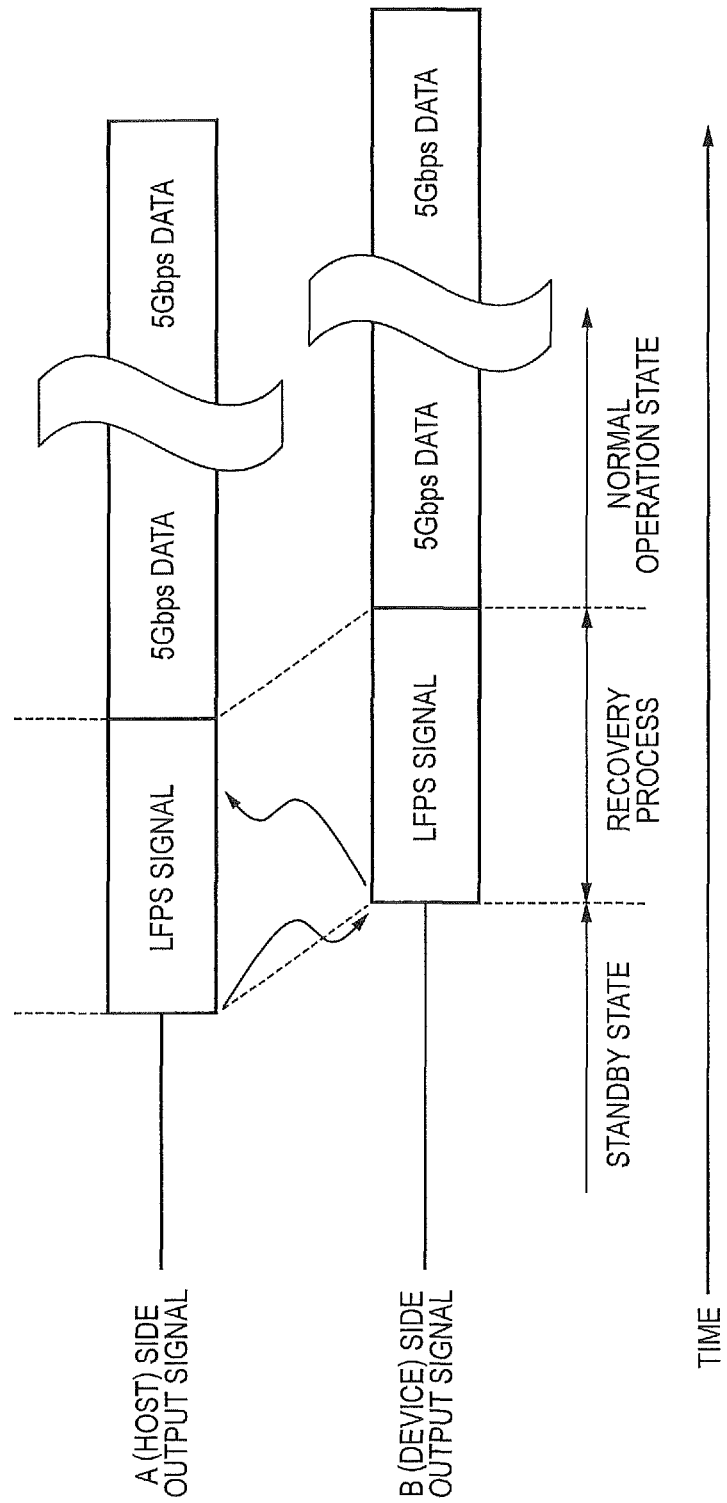
FIG. 3 is a diagram showing the recovery operation from the standby mode state.

An overview of the present invention is first of all described. The reference numerals for the drawings attached to this overview are intended to help simplify the description and do not limit the scope of the present invention in any way.

Figure 18:
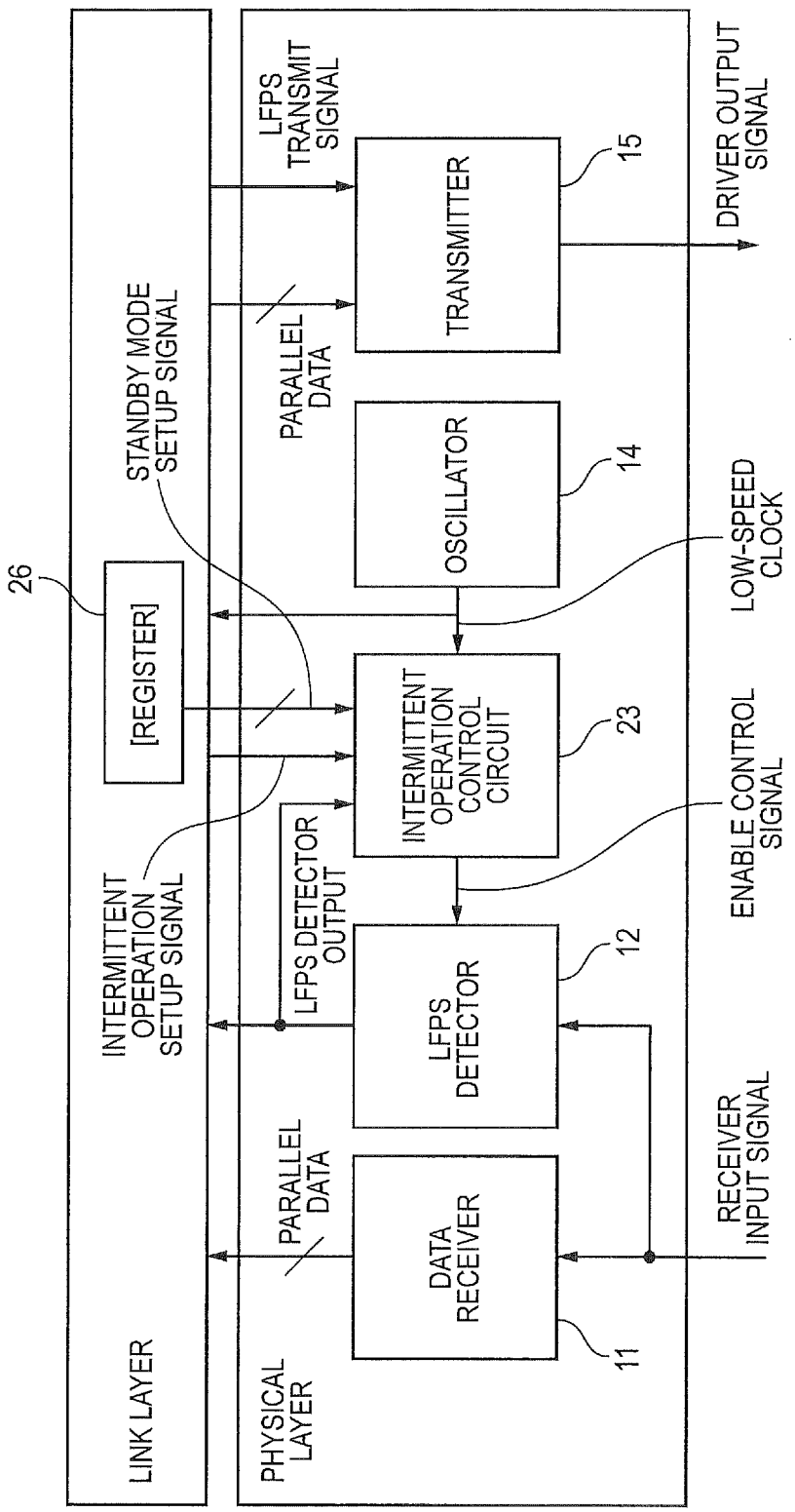
FIG. 18 is a block diagram showing the semiconductor device of the second embodiment.

The semiconductor device in FIG. 18 includes a detector (LFPS detector 12) that receives an input signal for example an LFPS signal whose characteristics (for example, the burst length of the LFPS signal in FIG. 20) fluctuate depend on (for example, U1 mode through U3 modes in FIG. 20) the standby mode state, compares the amplitude of the applicable input signal to a specified threshold amplitude, and outputs a detection signal (LFPS detector output) showing whether or not the amplitude of the applicable input signal is larger than the specified threshold amplitude; and an intermittent operation control circuit 23 that along with receiving the detection signal(detector output), receives a first signal (standby mode setup signal) showing which among the multiple modes (U1 mode through U3 mode) the standby mode state is in, and sets the detector 12 to the continuously on(enable) mode state if the input signal is larger than a specified threshold amplitude, and in all other cases intermittently operates the detector 12 depend on the characteristics of the input signal in the mode shown by the first signal.

Figure 21:
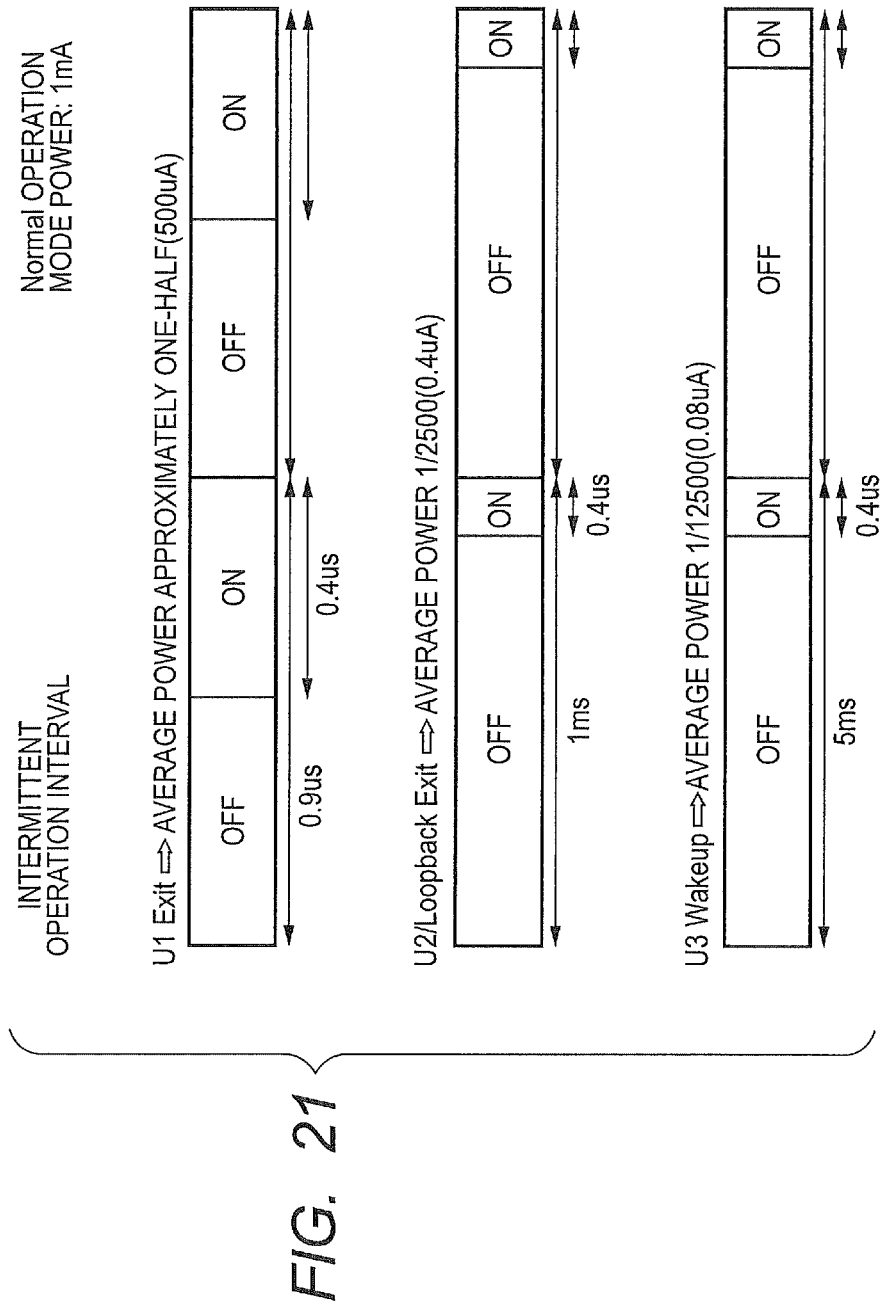
FIG. 21 is drawings showing the intermittent operation period set in each standby mode state in the semiconductor device of the second embodiment.

The intermittent operation control circuit 23 as shown in FIG. 20 and FIG. 21 preferably sets the detector 12 to the on (enable) mode state for a specified period within a time cycle depend on the maximum burst length (Max of the tBurst in FIG. 20) of the input signal (LFPS signal) in the mode shown by the first signal (standby mode setup signal) and in all other periods sets the detector 12 to the off (disable) mode state.

An intermittent operation control circuit 23 sets the detector 12 to the on (enable) mode state for a specified period in the time cycle from half the maximum burst length of the input signal (LFPS signal) for the mode shown by the first signal (standby mode setup signal) to the maximum burst length, and in all other periods sets the detector 12 to the off (disable) mode state.

Figure 7:
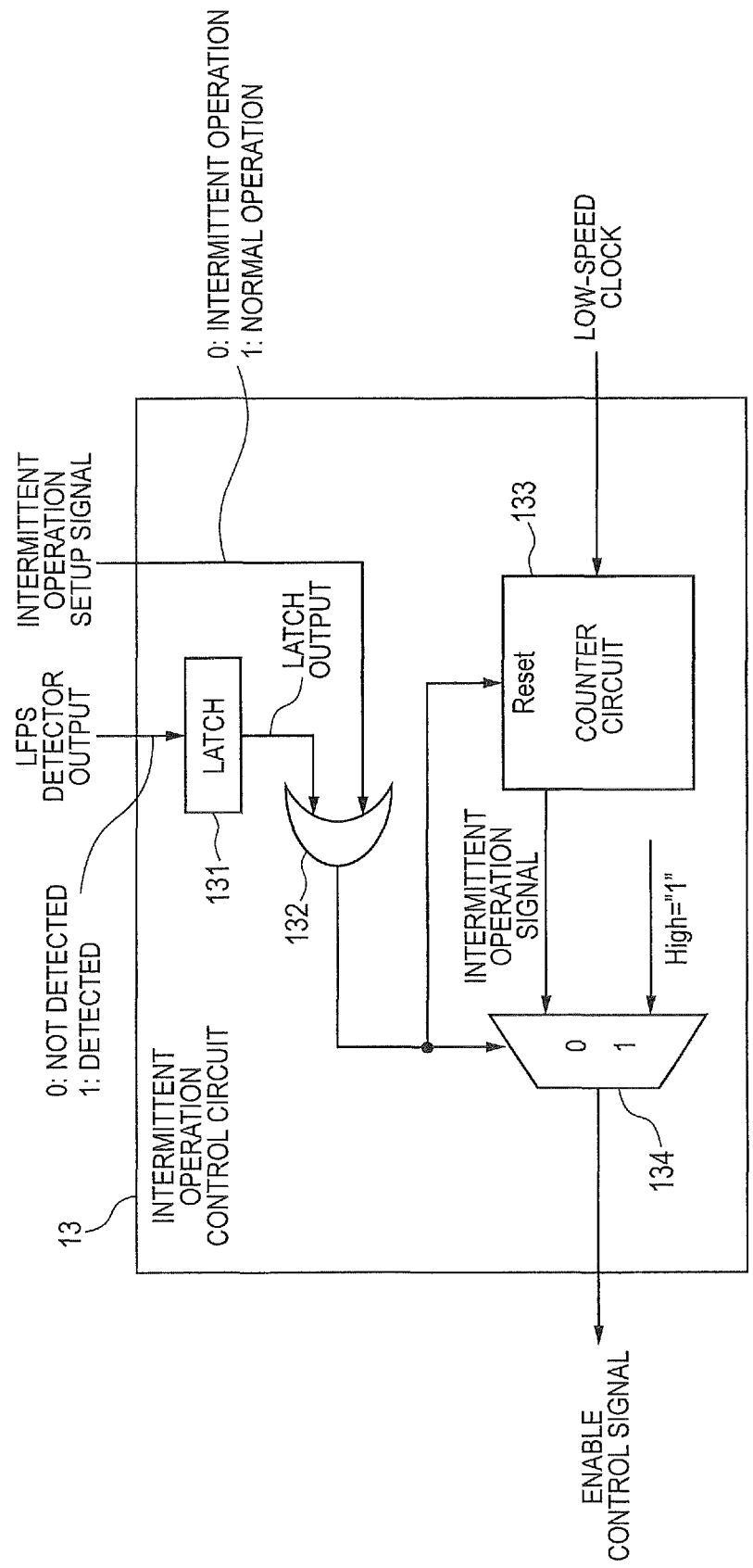
FIG. 7 is a block diagram showing the structure of the intermittent operation control circuit for the semiconductor device of the first embodiment.
Figure 10:
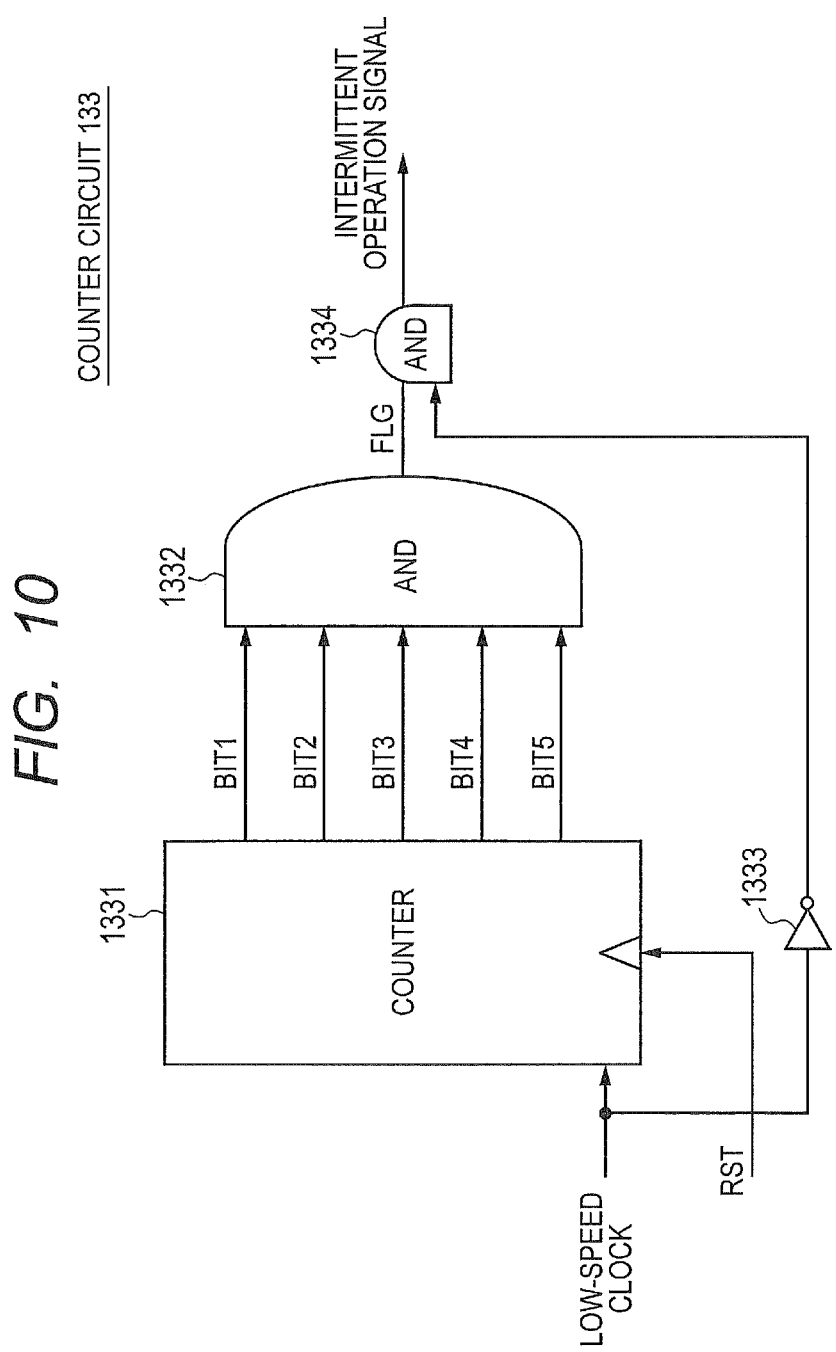
FIG. 10 is a circuit diagram showing the structure of the counter circuit in the intermittent operation control circuit for the semiconductor device of the first embodiment.
Figure 13:
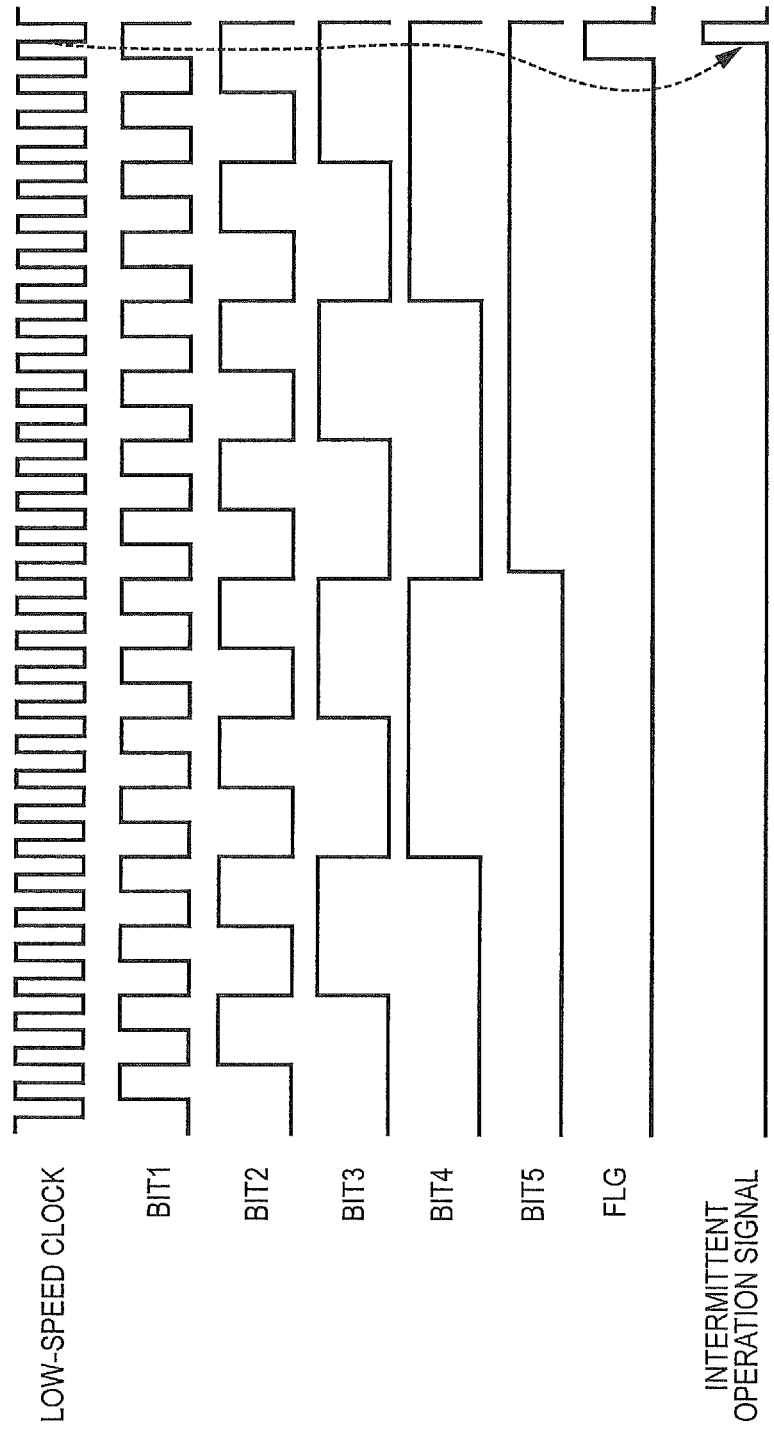
FIG. 13 is a timing chart showing the operation of the counter circuit in the intermittent operation control circuit operation for the semiconductor device of the first embodiment.

Referring to FIG. 7, FIG. 10, and FIG. 13, the semiconductor device further includes an oscillator 14 to supply a clock signal (low-speed clock signal). The intermittent operation control circuit 13 frequency-divides the applicable clock signal to generate a plurality of frequency-divided clock signals (BIT1-BIT5) and by obtaining the logical product of the applicable plural frequency-divided clock signals, may generate a signal (intermittent operation signal) for intermittently operating the detector (12).

The above described input signal may be a LFPS (Low Frequency Periodic Signaling) signal sent from the USB (Universal Serial Bus) device.

Referring to FIG. 18, either the detector 12 or the intermittent operation control circuit 23 may be formed in a physical layer.

Referring to FIG. 18, the semiconductor device may further include a register 26 to retain information showing which mode among the multiple standby modes is in, and the intermittent operation control circuit 23 may be set so as to receive the first signal (standby mode setup signal) from the register 26.

Figure 22:
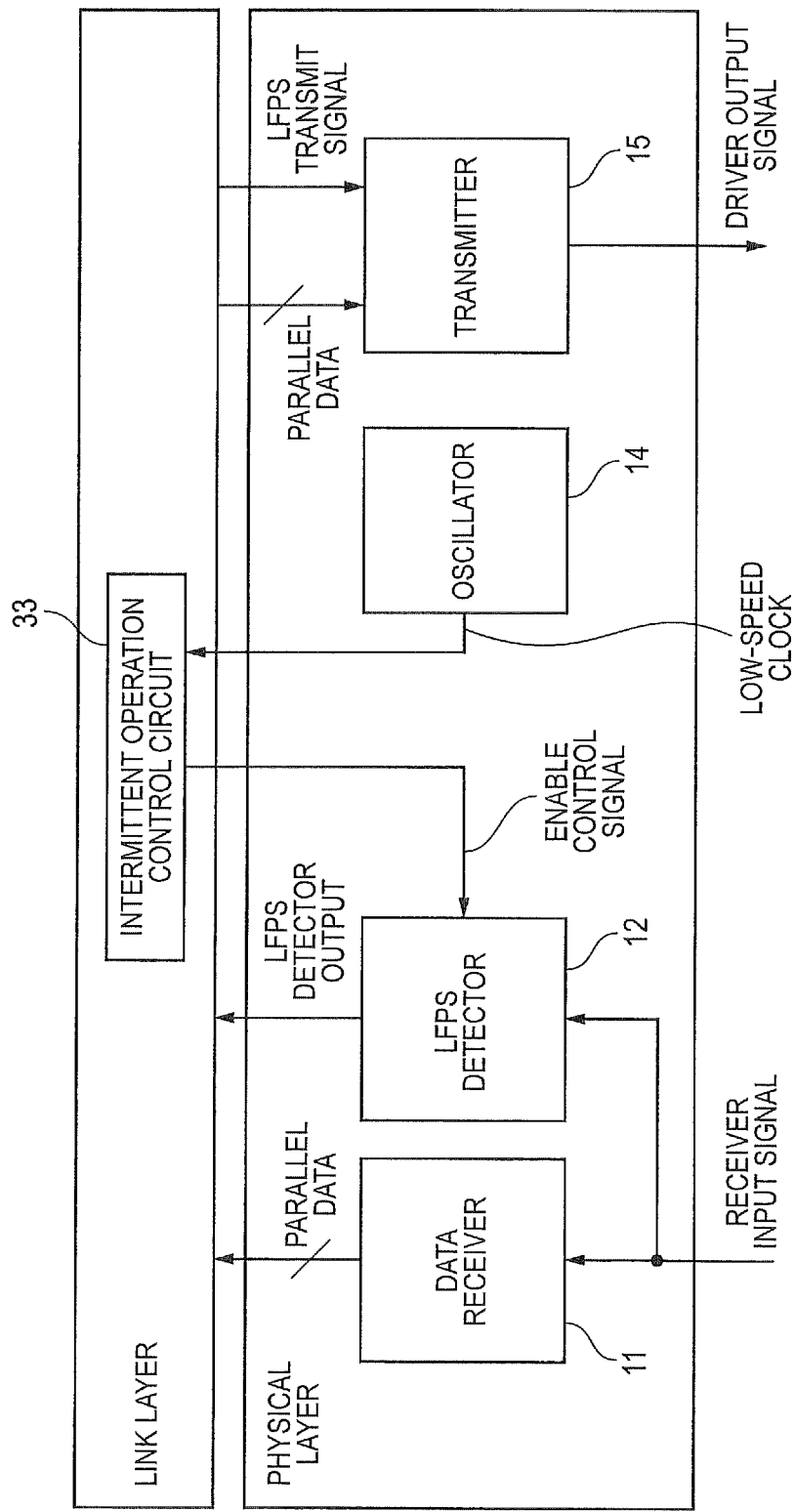
FIG. 22 is a block diagram showing the structure of the semiconductor device of the third embodiment.

Referring to FIG. 22, the detector 12 is formed in a physical layer, and the intermittent operation control circuit 33 may be formed in the link layer.

Figure 19:
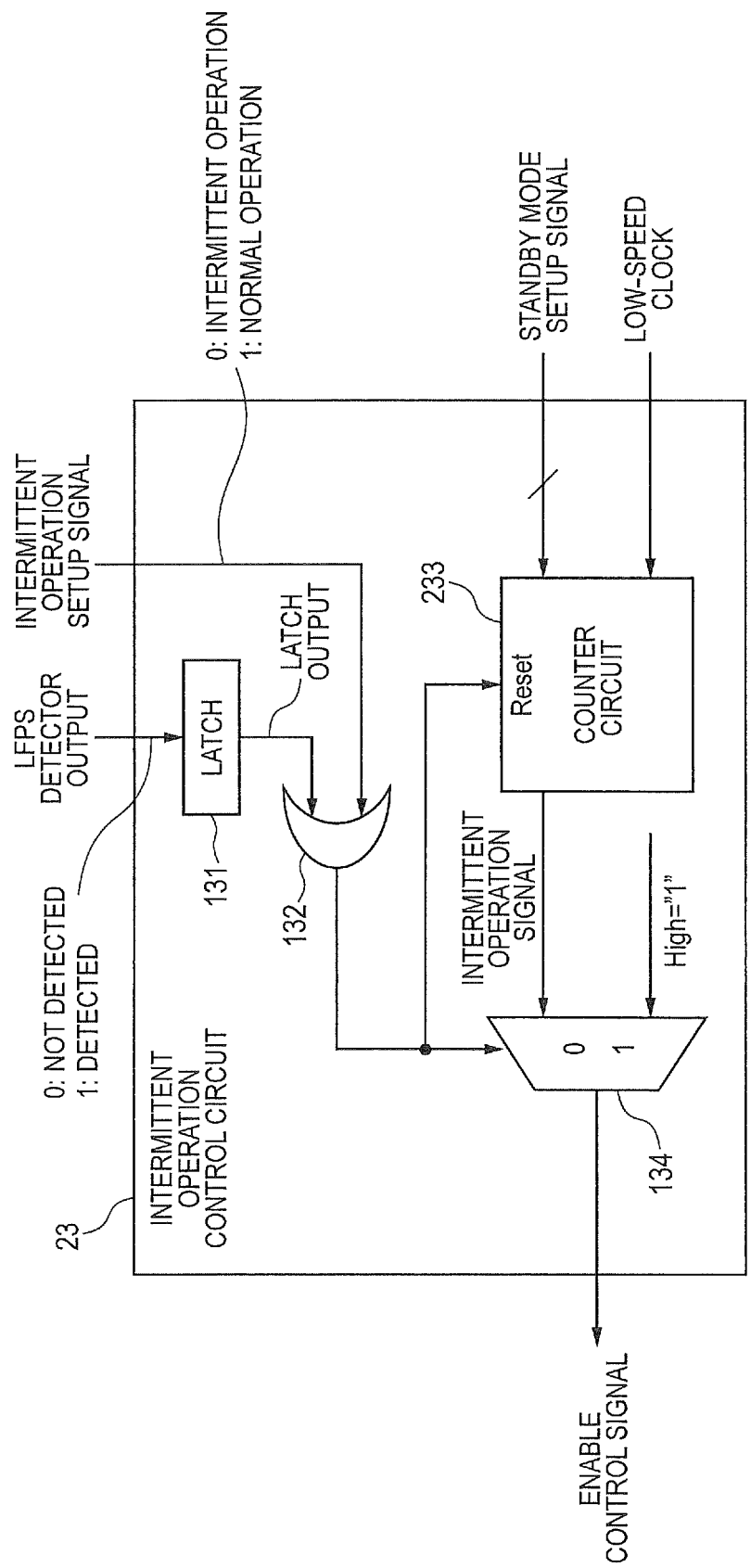
FIG. 19 is a block diagram showing the structure of the intermittent operation control circuit for the semiconductor device of the second embodiment.

Referring to FIG. 18 and FIG. 19, the intermittent operation control circuit 23 receives a second signal (intermittent operation setup signal) showing whether to operate the detector 12 normally (continuously) or intermittently operate the detector 12, and when the input signal is above the specified threshold amplitude (LFPS detection signal="1") or when the second signal shows the detector 12 must be operated normally (intermittent operation setup signal="1") then the intermittent operation control circuit 23 sets the detector 12 to the continuously operation (enable) state, and in all other cases intermittently operates the detector circuit 12.

Figure 23:
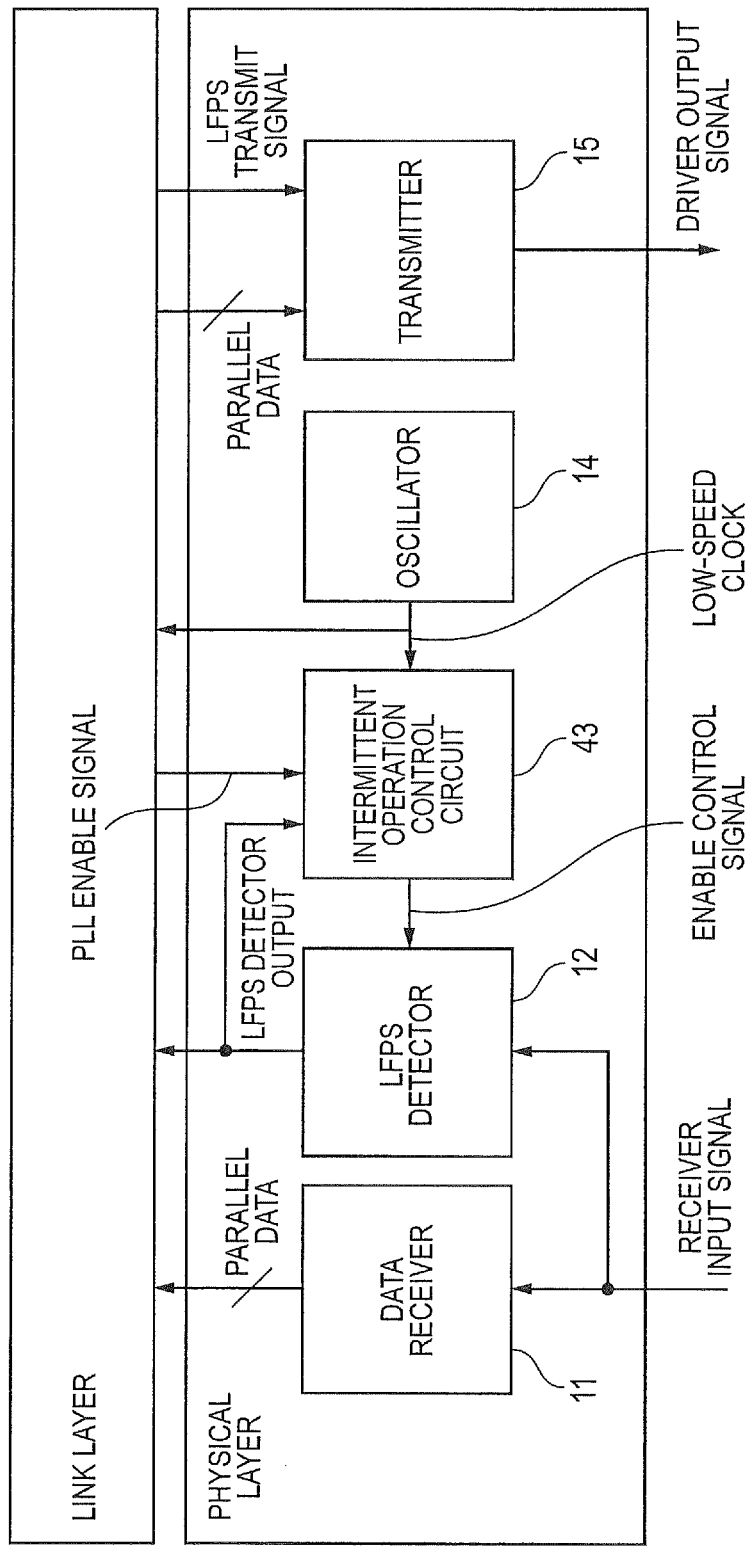
FIG. 23 is a block diagram showing the structure of the semiconductor device of the fourth embodiment.

Referring to FIG. 23, an intermittent operation control circuit 43 identifies the standby mode state mode based on the enable signal (PLL enable signal) for the PLL circuit from the link layer instead of utilizing the first signal and the second signal, and also sets whether or not to normally (continuously) operate or to intermittently operate the detector 12.

Figure 24:
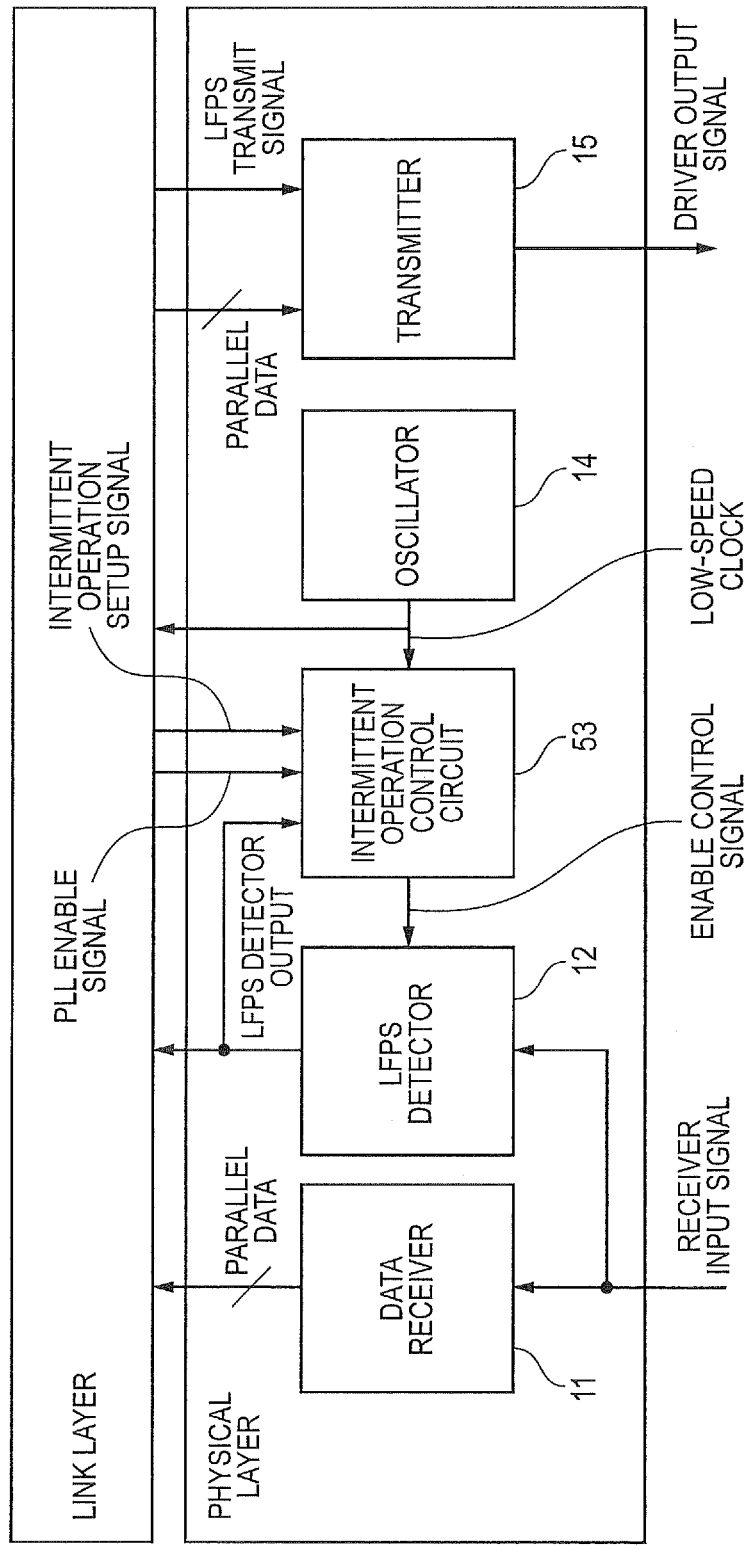
FIG. 24 is a block diagram showing the structure of the semiconductor device of the fifth embodiment.

Referring to FIG. 24, an intermittent operation control circuit 53 may be set to identify the standby mode states based on the enable signal (PLL enable signal) of the PLL circuit, output from the link layer, instead of utilizing the first signal.

Figure 25:
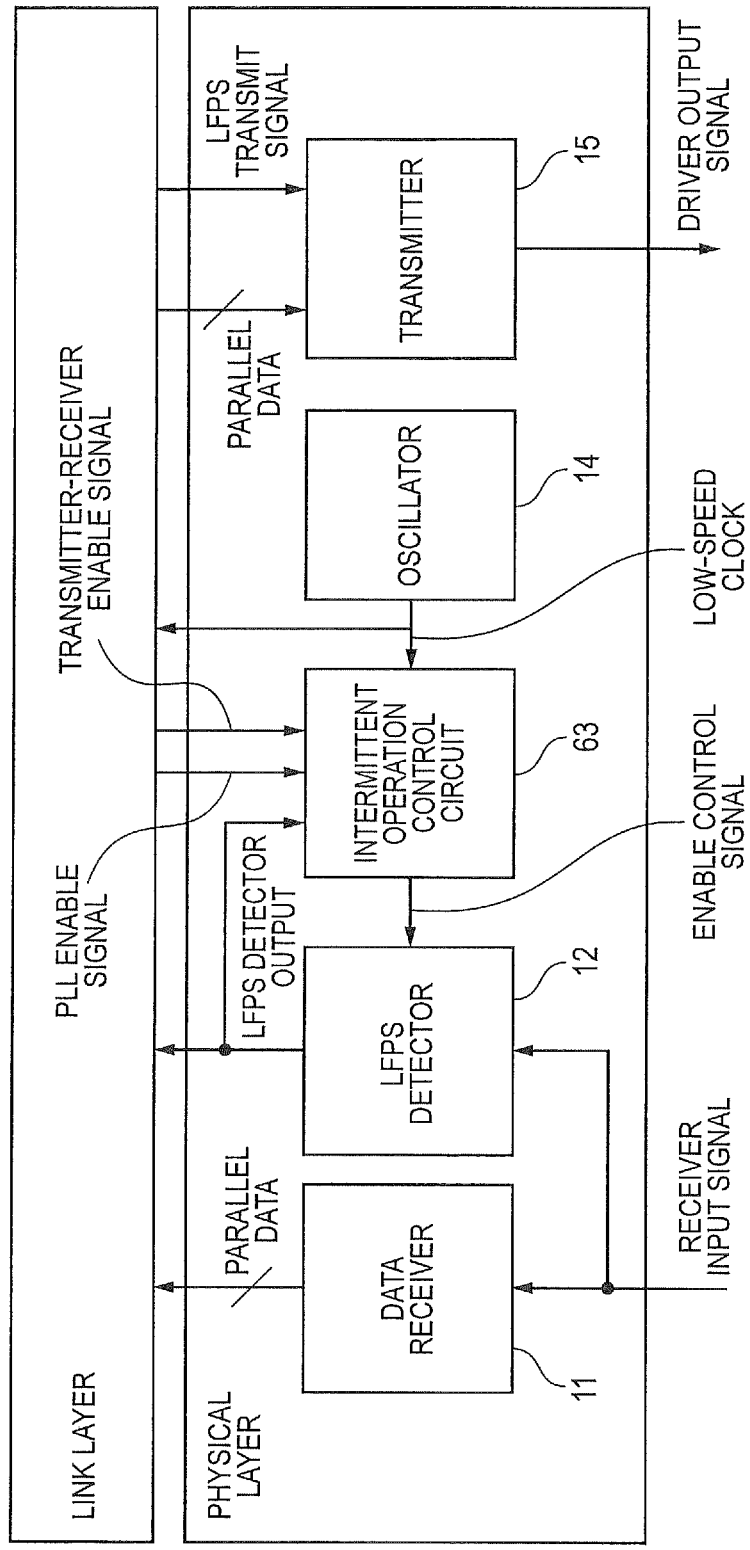
FIG. 25 is a block diagram showing the structure of the semiconductor device of the sixth embodiment.

Referring to FIG. 25, an intermittent operation control circuit 63, may be set to identify the mode in the standby mode state based on the enable signal (PLL enable signal) for the PLL circuit, output from the link layer, instead of utilizing the first signal and the second signal; and also sets whether to normally (continuously) operate or to intermittently operate the detector 12 based on the enable signal (transmitter-receiver enable signal) for the transmitter-receiver.

Figure 26:
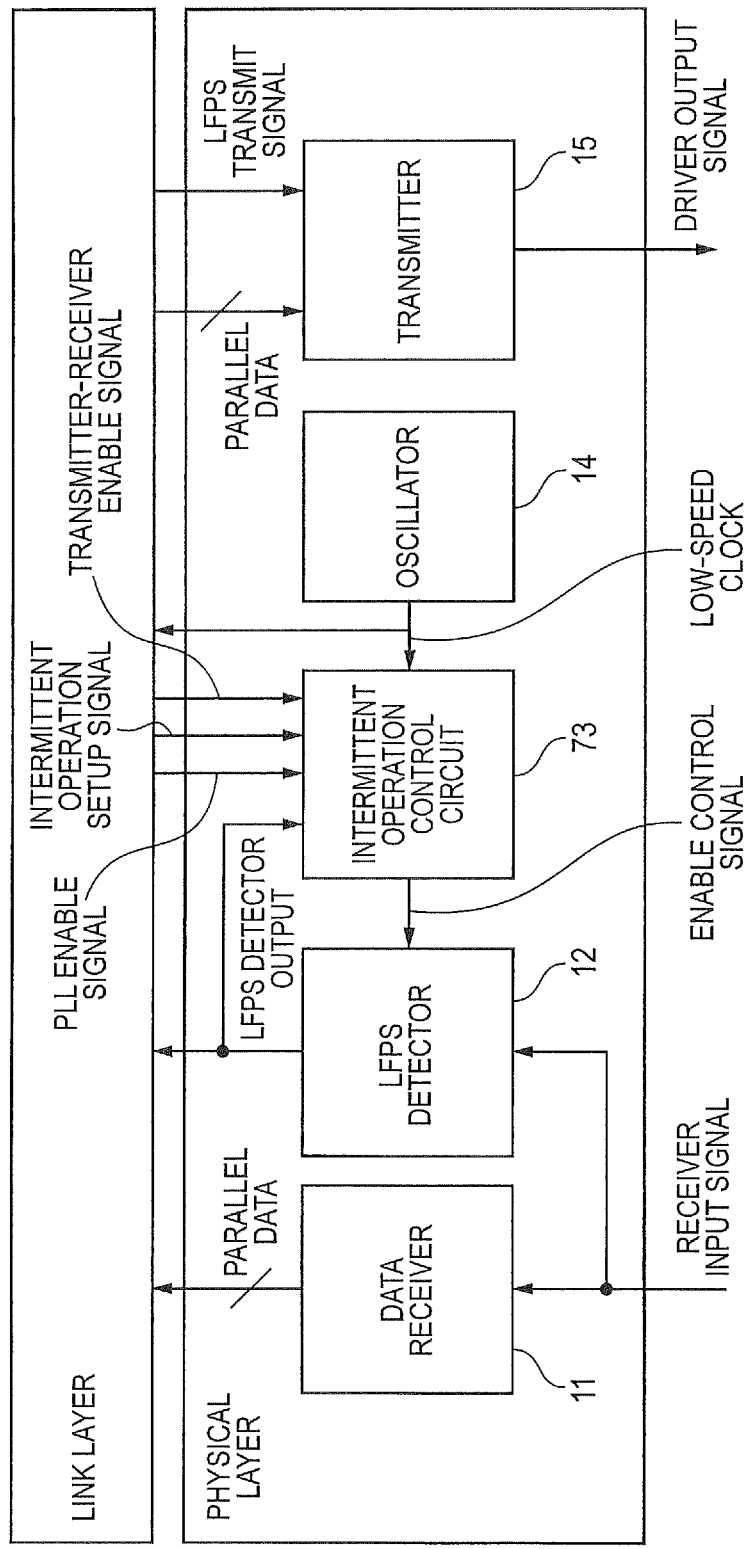
FIG. 26 is a block diagram showing the structure of the semiconductor device of the seventh embodiment.

Referring to FIG. 26, an intermittent operation control circuit 73 may be set to identify the standby mode state based on the enable signal (PLL enable signal) for the PLL circuit, output from the link layer, instead of utilizing the first signal, and the enable signal (transmitter-receiver enable signal) for the transmitter-receiver.

The present invention lowers the LFPS detector 12 power consumption over an average time by intermittently operating the LFPS detector 12 during standby mode, in order to reduce the power consumed during standby mode while maintaining the detection threshold accuracy of the LFPS detector 12. The LFPS detector 12 having a high detection threshold accuracy can still be utilized at this time so that both a high detection threshold accuracy and low power consumption can be achieved.

An oscillator (ring oscillator) 14 is embedded in the physical layer for supplying a low-speed clock to the link layer during standby mode, and the oscillator 14 is also in the operating state during standby mode. The intermittent operation control circuits (23, 33, 43, 53, 63, 73) utilize low-speed clock signals from the oscillator to set the LFPS detector 12 to the operating state just for a fixed period in cycles and generate enable control signals to set the LFPS detector 12 to the stop state for the remaining period. Intermittent operation of the LFPS detector 12 is implemented by periodically turning the LFPS detector circuit enable and disable by the enable control signal.

First Embodiment

Figure 6:
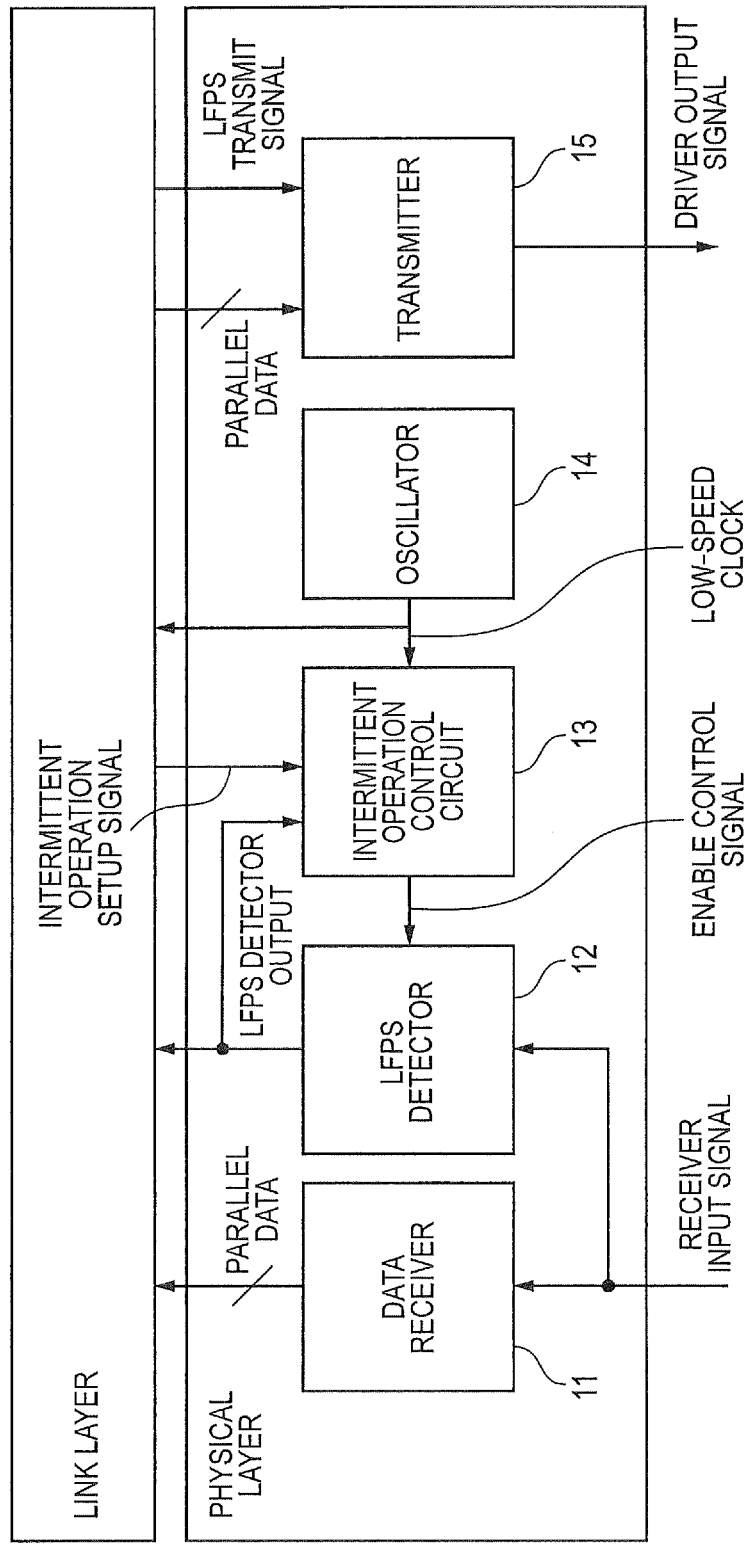
FIG. 6 is a block diagram showing the structure of the semiconductor device of the first embodiment.

The semiconductor device of the first embodiment is described next while referring to the drawings. FIG. 6 is a block diagram showing one example of the structure of the semiconductor device of this embodiment. FIG. 6 shows a physical layer for sending and receiving data, and a link layer for supervising the procedure and method for sending and receiving data in the serial interface. As shown in FIG. 6, the physical layer of the semiconductor device includes a data receiver 11 for receiving high-speed signals, and a transmitter 15 for outputting the high-speed signal, an oscillator 14 for supplying low-speed clock signal to the upper layer, an intermittent operation control circuit 13 to generate intermittent operation control signals for the LFPS based on the low-speed clock signals, and a LFPS detector 12 to receive low speed LFPS signals.

FIG. 7 is a block diagram showing one example of the structure of the intermittent operation control circuit 13. Referring to FIG. 7 shows that the intermittent operation control circuit 13 includes a counter circuit 133 to generate intermittent operation signals from low-speed clock signals, a latch circuit 131 to input LFPS detection signals output from the LFPS detector 12, an OR circuit 132 to input latch outputs and intermittent operation setup signals, and a selector circuit 134 to set the OR circuit output as a select signal, and to input the enable signals and the intermittent operation signals output from the counter circuit 133.

Figure 8:
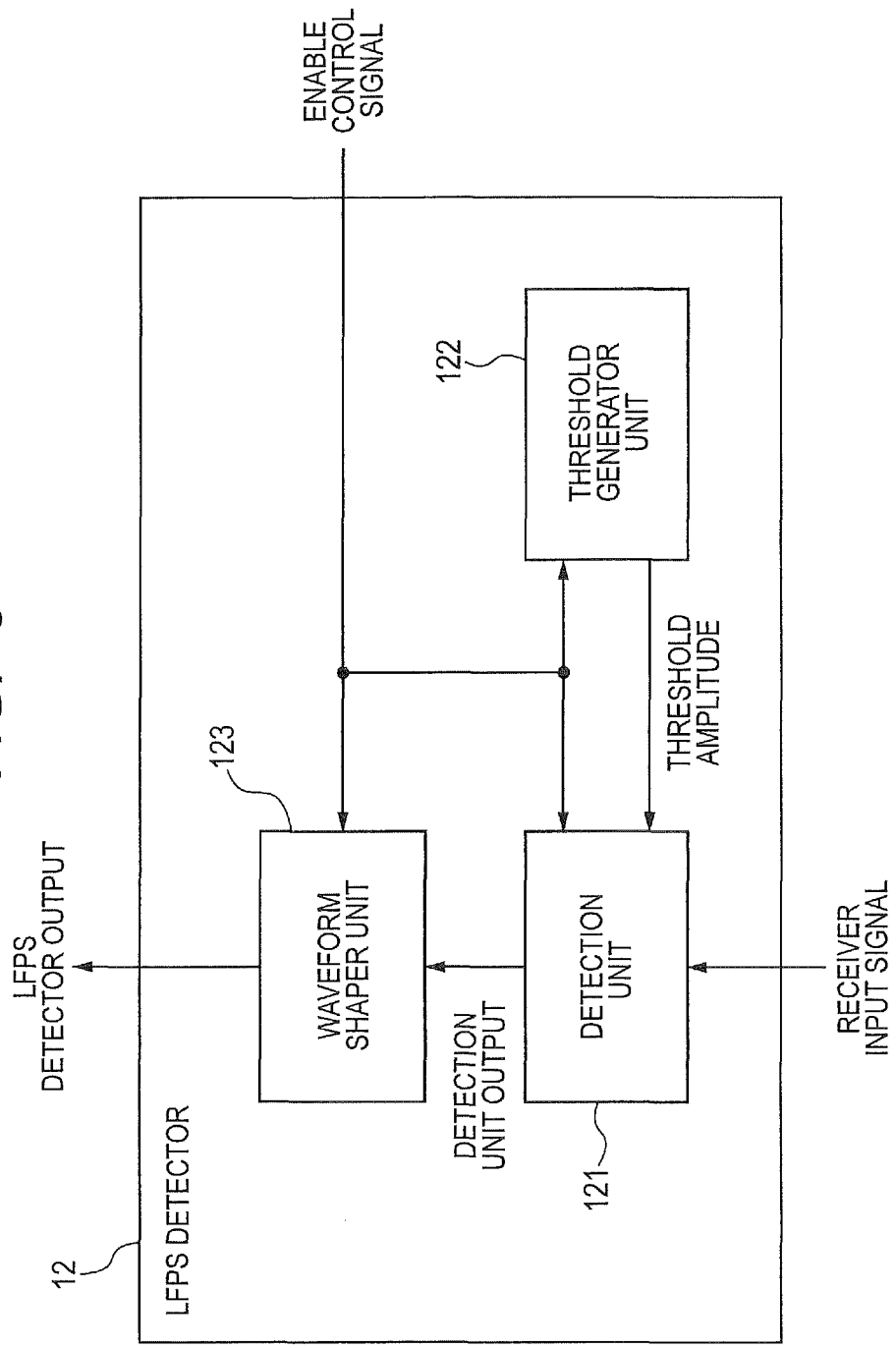
FIG. 8 is a block diagram showing the structure of the LFPS detector of the semiconductor device of the first embodiment.

FIG. 8 is a block diagram showing one example of the structure of the LFPS detector 12. Referring to FIG. 8, the LFPS detector 12 includes a detection unit 121 to input the receiver input signals and the threshold amplitude, a wave shaper unit 123 provided inputs to the detection unit output, and a threshold generator unit 122 to generate the threshold amplitude.

Figure 9:
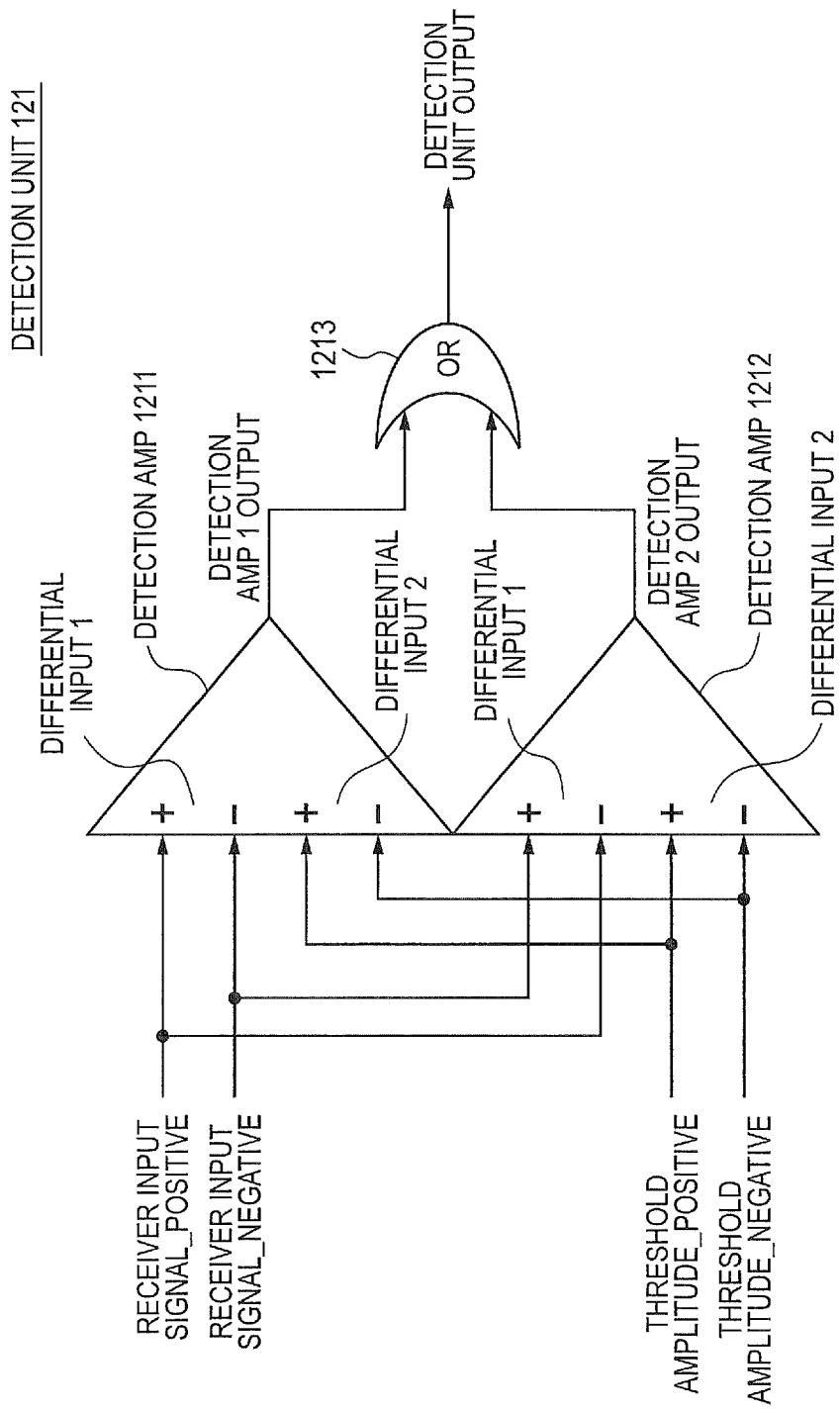
FIG. 9 is a circuit diagram showing the structure of the detection unit in the LFPS detector of the semiconductor device of the first embodiment.

FIG. 9 is a circuit diagram showing one example of the structure of the detection unit 121 within the LFPS detector 12. Referring to FIG. 9, the detection unit 121 includes the detection amps 1211, 1212; and an OR circuit 1213 that is input by the outputs of the detection amp 1211 and the detection amp 1212. The detection amp 1211 inputs the receiver input signal_positive (or positive receiver input signal) to the positive input of the differential input 1, and inputs the receiver input signal_negative (or negative receiver input signal) to the negative input; inputs the threshold amplitude_positive to the positive input of the differential input 2, and inputs the threshold amplitude_negative to the negative input. The detection amp 1212 on the other hand, inputs the receiver input signal_negative to the positive input of the differential amp 1, and inputs the receiver input signal_positive to the negative input; inputs the threshold amplitude_positive (or positive threshold amplitude) to the positive input of the differential input 2, and inputs the threshold amplitude_negative (or negative threshold amplitude) to the negative input. The OR circuit 1213 receives the outputs from the detection amps 1211, 1212 and outputs the OR calculated results as the detection unit output.

Figure 4:
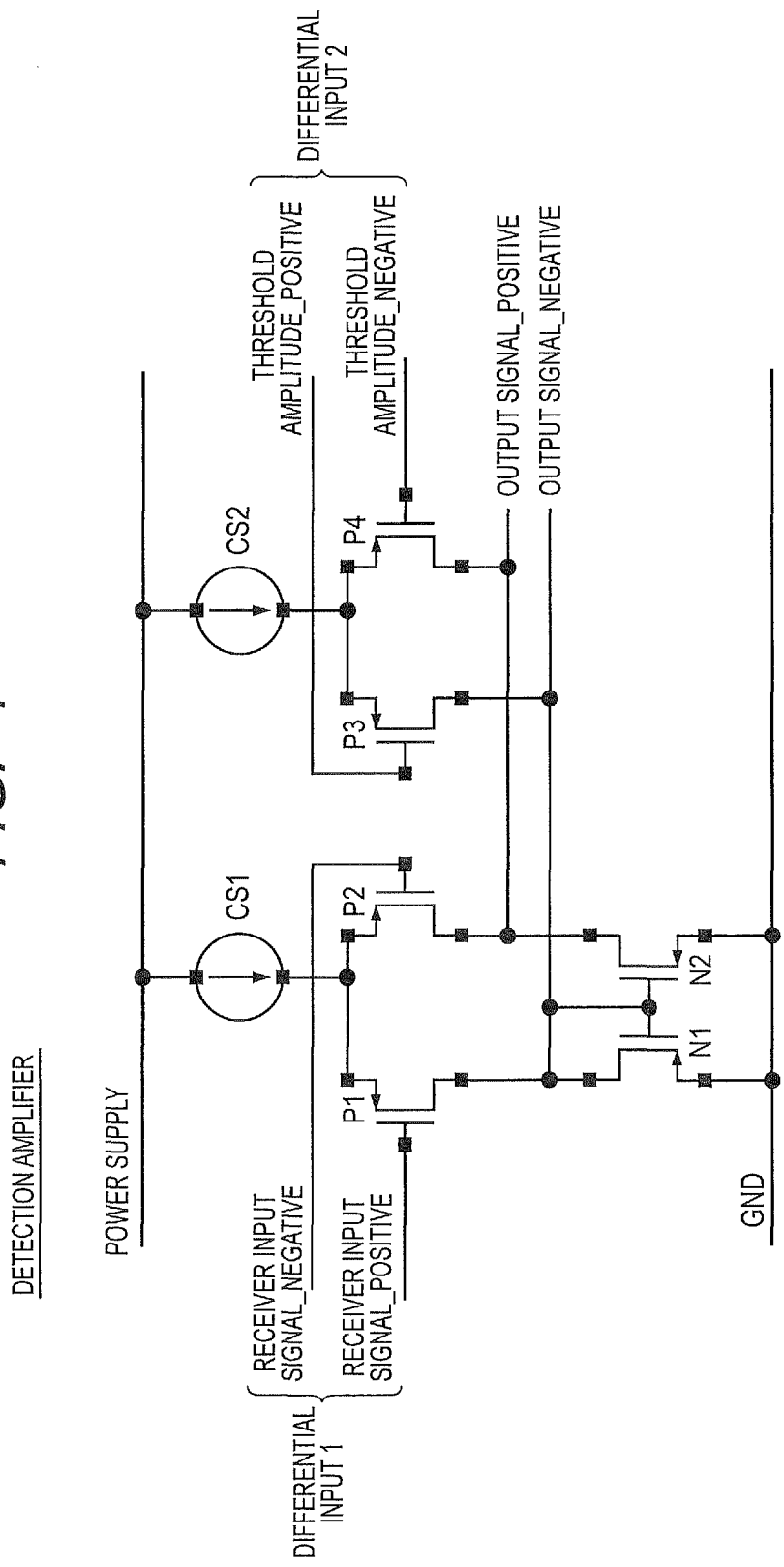
FIG. 4 is a circuit diagram showing the structure of the detector amplifier in the LFPS detector.
Figure 5:
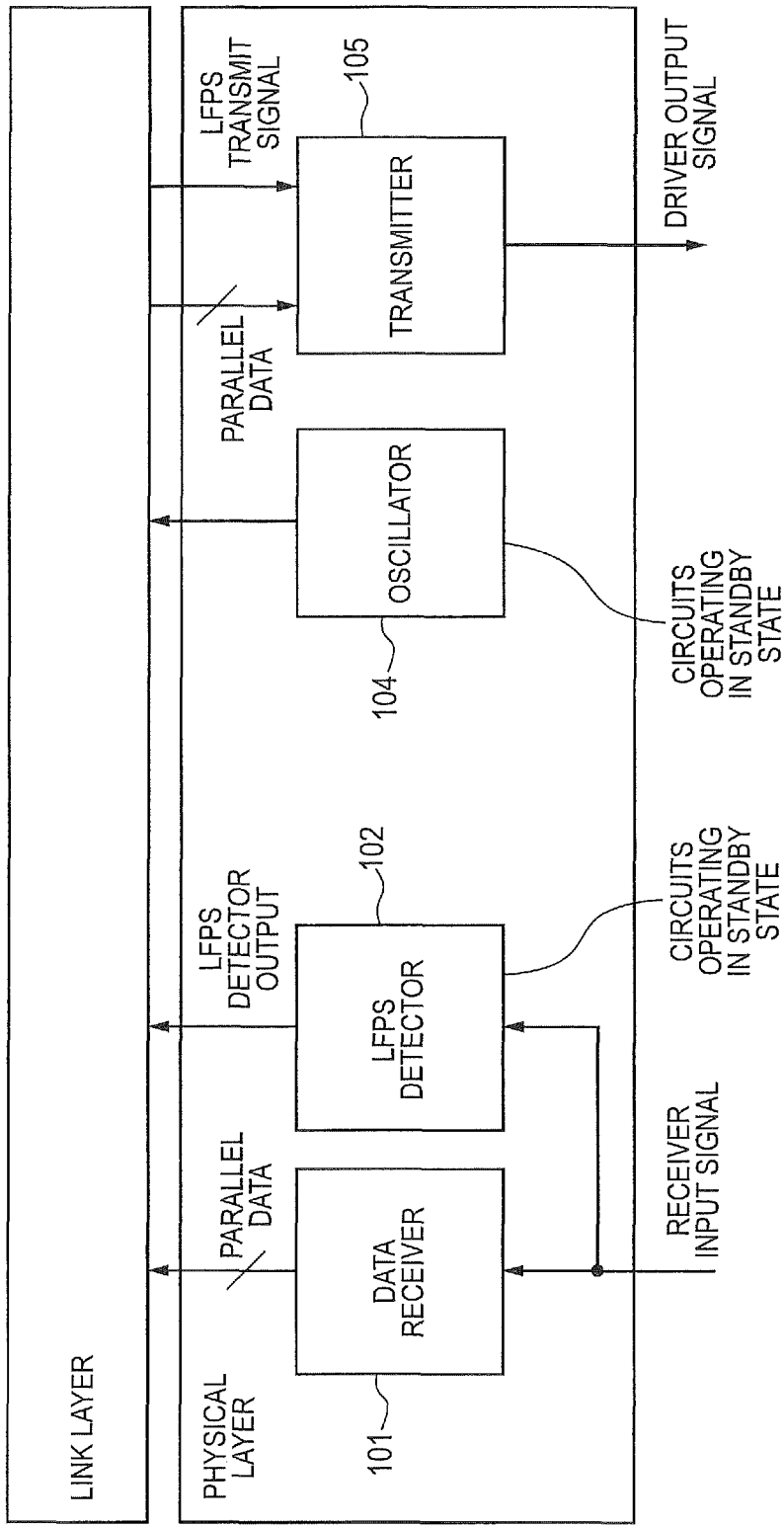
FIG. 5 is a block diagram showing the structure of the semiconductor device of the related art.

FIG. 4 is a circuit diagram showing one example of the structure of the detector amps 1211, 1212 in the detection unit 121 of the LFPS detector 12. Referring to FIG. 4, the detection amp is a CML type amplifier circuit including an active load configured from the N-channel (Nch) MOS transistors N1, N2, and also two differential pairs configured from the P-channel (Pch) MOS transistors P1-P4. The detection amplifier differentially inputs the receiver input signal to the differential input 1, and the threshold amplitude to the differential input 2, and judges the receiver input signal input to the differential input 1 at a threshold depend on the input threshold amplitude that was input to the differential input 2, and outputs the judgment results. The detection amplifier shown in FIG. 4 is a CML type amplifier and so supplies a constant fixed current from the current sources CS1 and CS2 coupled to each differential pair during operation.

FIG. 10 is a circuit diagram showing one example of the structure of the counter circuit 133 in the intermittent operation control circuit 13. Referring to FIG. 10, the counter circuit 133 includes a counter unit 1331, AND circuits 1332, 1334, and an inverter circuit 1333. The counter circuit 133 receives a low-speed clock signal and a reset signal RST, and outputs an intermittent operation signal. The counter 1331 receives the low-speed clock signal CLK, and outputs it subdivided into the ½th, ¼th, ⅛th ¹⁄₁₆th, and ¹⁄₃₂nd signals respectively as the frequency-divided signals BIT1 through BIT5. The AND circuit 1332 receives the frequency-divided signal BIT1 through BIT5 and outputs the AND-calculated results as the flag signal FLG. The AND circuit 1334 outputs the AND-calculated results obtained by way of the flag FLG, and the low-speed clock signal CLK via the inverter circuit 1333, as the intermittent operation signal.

The operation of the semiconductor device of the present embodiment is described next. In the semiconductor device shown in FIG. 6, only the oscillator 14, the intermittent operation control circuit 13, and the LFPS detector 12 are in the operating (enable) state.

The LFPS detector 12 is controlled in the intermittent operation mode, the normal operation (always enable) mode, the stop (Disable) mode based on the enable control signal from the intermittent operation control circuit 13.

In intermittent operation mode, the intermittent operation control circuit 13 sets the LFPS detector 12 to the operating (enable) state only for a fixed time in the cycles based on the low-speed clock signal output from the oscillator 14, and generates an enable control signal that sets the LFPS detector 12 to the stop (disable) state in the remaining time. Inputting the enable control signal into the enable control terminal of the LFPS detector 12 makes the LFPS detector 12 perform repeated cyclic operation/stop. In normal operation (always enable) mode, the LFPS detector 12 is set to the always enable operation state, and in the stop (Disable) mode is set to the always stop state.

An intermittent operation setup signal is applied to the intermittent operation control circuit 13 as shown in FIG. 6, from the link layer that monitors the normal mode/standby mode.

FIG. 11 is a truth table showing the operation of the intermittent operation control circuit 13. Referring to FIG. 11, the intermittent operation control circuit 13 sets to intermittent operation mode when the intermittent operation setup signal="0" (intermittent operation) and also the LFPS detection output="0" (not detected state). At this time, when the OR circuit 132 outputs an "0", the selector 134 selects an output from the counter circuit 133, and the intermittent operation signal generated in the counter circuit 133 is output as an enable control signal. On the other hand, when the intermittent operation setup signal="1" (normal operation) or the LFPS detection output="1" (detected state), the intermittent operation control circuit 13 sets to normal operation (always enable) mode. The OR circuit 132 at this time outputs a "1", and the selector 134 selects a High="1" input, and the signal that sets the LFPS detector 12 to the enable state is output as an enable control signal.

Figure 12:
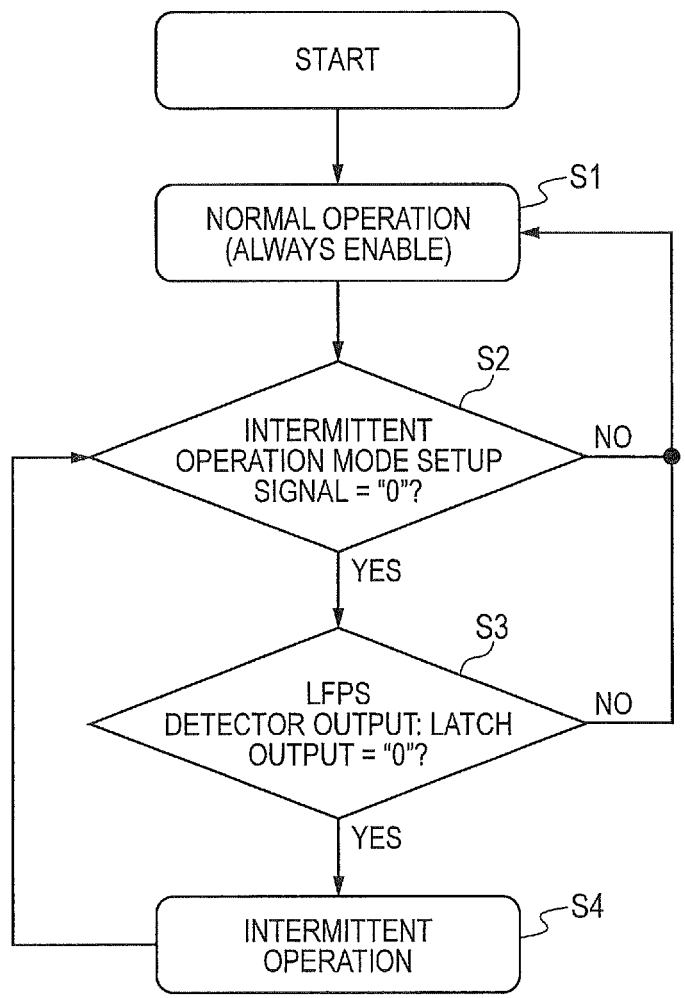
FIG. 12 is a flow chart showing the operation of the intermittent operation control circuit operation for the semiconductor device of the first embodiment.

FIG. 12 is a flow chart showing the operation of the intermittent operation control circuit 13. Referring to FIG. 12, when in intermittent operation mode (YES in step S2), the intermittent operation control circuit 13 continues the intermittent operation mode (step S4) while the LFPS signal input still has not been detected (YES in step S3). However, when the LFPS detector 12 detects the LFPS signal, the latch circuit 131 in the intermittent operation circuit 13 as shown in FIG. 7 retains the LFPS detector output="1" (NO in step S3), and the intermittent operation signal output from the counter 133 output from the selector 134 is fixed at High="1." The operation in this way shifts from intermittent operation (step S4) to the continuously operating mode (step S1), and the intermittent operation of the LFPS detector ends.

FIG. 13 is a timing chart showing the operation of the counter circuit 133 shown in FIG. 10. Referring to FIG. 13, the counter 1331 generates five types of frequency-divided signals BIT1 through BIT5 up to the 2 through 32 divisions based on the low-speed clock signal CLK, and outputs a "1" as a flag signal FLG under the condition that all of the frequency-divided signals BIT 1 through BIT 5 are "1." The AND circuit 1334 generates a signal whose output is "1" only for the ¹⁄₆₄ period in the cycle of the low-speed clock signal CLK by taking the logical product (AND) of the inverted low-speed clock signal CLK and the flag signal FLG, and outputs this signal as an intermittent operation signal from the counter circuit 133.

Figure 14:
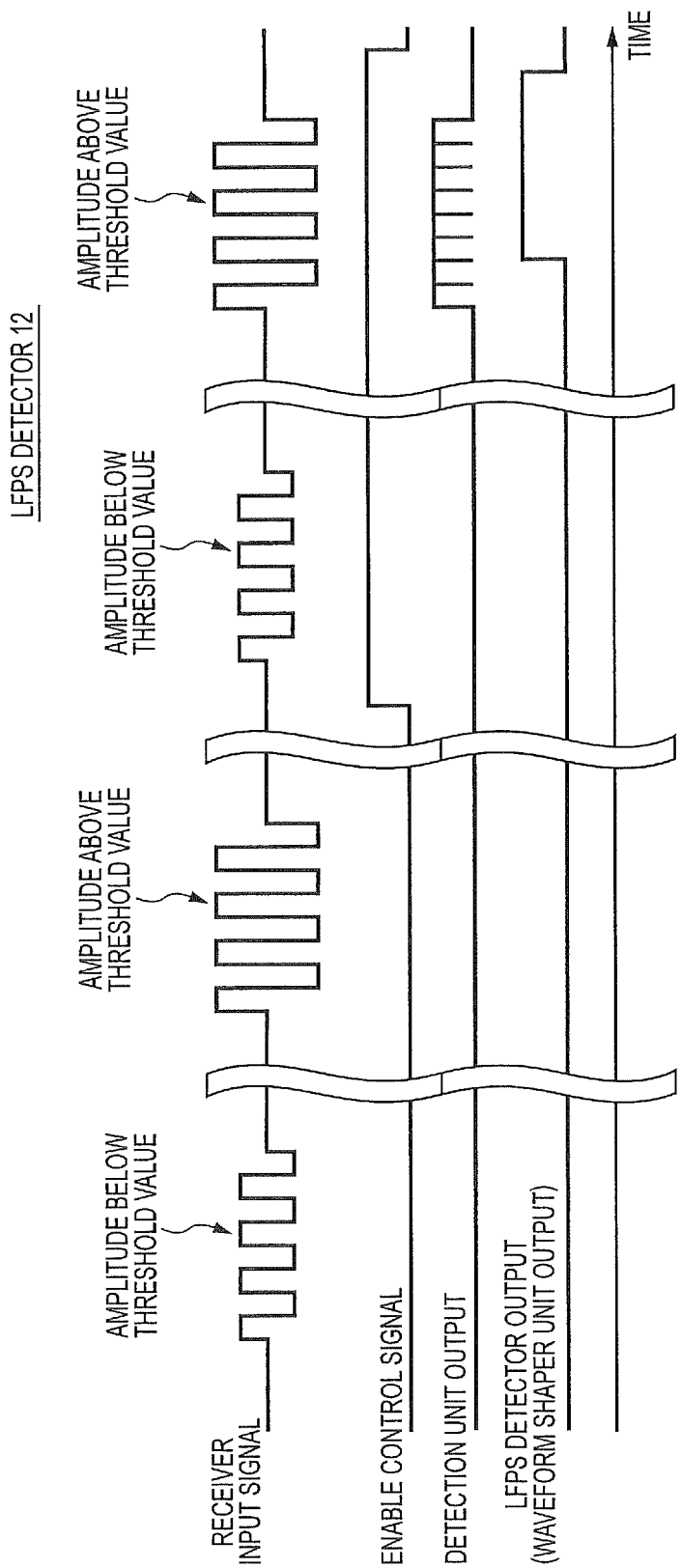
FIG. 14 is a timing chart showing the operation of the LFPS detector operation in the semiconductor device of the first embodiment.

FIG. 14 is a timing chart showing the operation of the LFPS detector 12 as shown in FIG. 8. Referring to FIG. 14, the LFPS detector 12 is stopped in the state where the enable control signal is low, and the detection unit 121 outputs no signals even if a signal possessing an amplitude higher than the threshold is input as the receiver input signal.

On the other hand, when the enable control signal is in the high state, the LFPS detector 12 is in the enable state. When a signal whose amplitude is higher than the threshold is input to the receiver input signal at this time, the detection unit 121 outputs the input LFPS signal as a folded waveform along the voltage direction centered between high and low. The detection unit 121 shown in FIG. 9 contains two detection amps 1211, 1212 to perform detection of both polarities (high/low) of the receiver input signal. The output waveform from the OR circuit 1213 is a folded waveform along the voltage direction centering between a high and low of the LFPS signal that was input. The waveform shaper unit 123 shapes the output waveform from the detection unit 121 as a waveform of consecutive pulses, into one pulse waveform, and outputs it as an LFPS detection signal.

Figure 15:
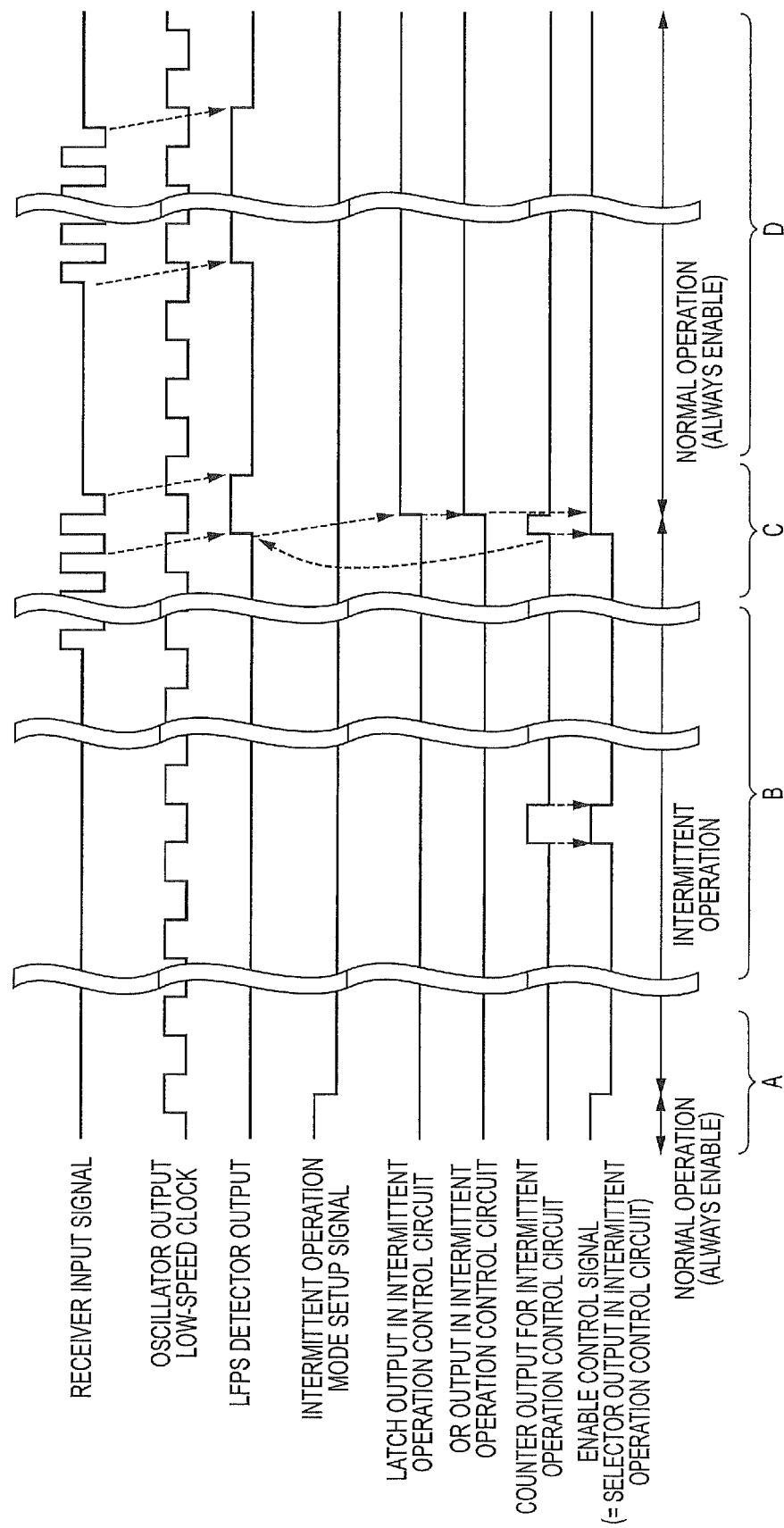
FIG. 15 is a timing chart showing the overall operation of the semiconductor device of the first embodiment.

FIG. 15 is a timing chart showing the series of operations relating to intermittent operation of the semiconductor device of the present embodiment.

Referring to FIG. 15, in the A period, when the intermittent operation setup signal is high, the LFPS detector 12 is in the normal operation (always enable) state. On the other hand, when the intermittent operation setup signal is low, the LFPS detector 12 shifts to the intermittent operation mode. Whereupon, the counter circuit 133 of the intermittent operation control circuit 13 operates, and starts to output the cyclically repeating high and low enable intermittent operation signals.

In the B period during intermittent operation mode, the enable control signal repeatedly goes high and low, and the intermittent operation of the LFPS detector 12 continues in the period where the LFPS signal is not detected.

In the C period during intermittent operation mode, when the LFPS detector 12 had detected the LFPS signal from the receiver input signal, then operation by the intermittent operation control circuit 13 ends the intermittent operation mode, and moves to the normal (continuous) operation mode. The counter circuit 133 of the intermittent operation control circuit 13 stops and the output is fixed at low.

In the D period, the LFPS detector 12 is in the normal mode state (always enable), and outputs an LFPS detector output with the same width as the burst width of the LFPS signal that was input as the receiver input signal.

Figure 16:
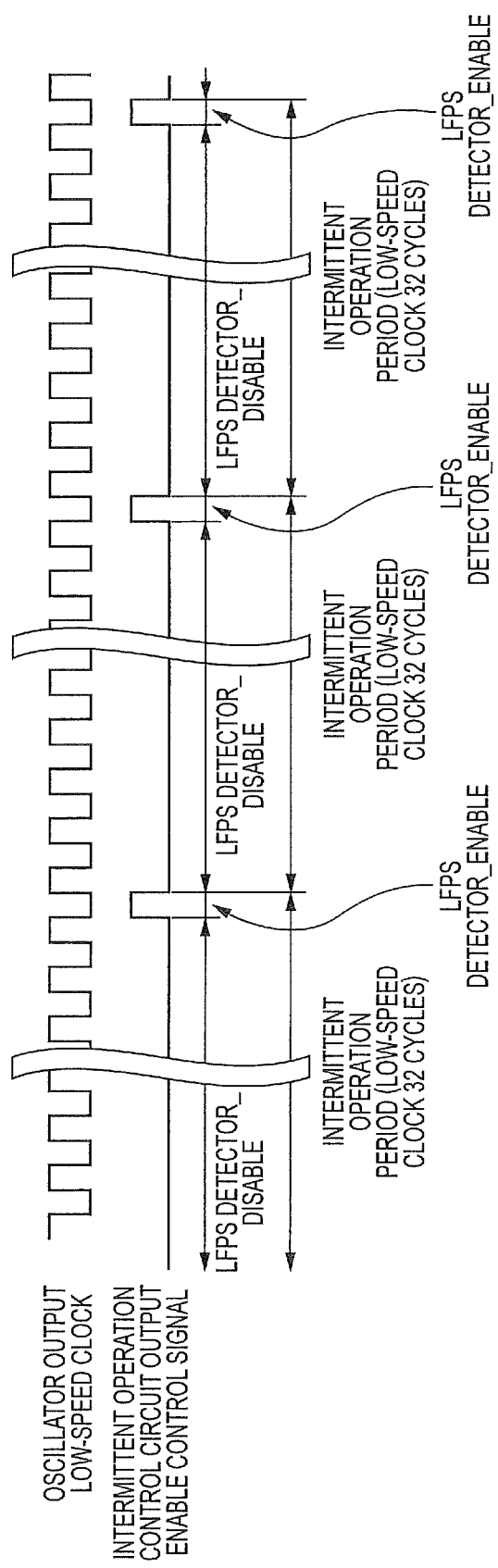
FIG. 16 is a timing chart showing the enable control signal and the operate and stop states of the LFPS detector during intermittent operation of the semiconductor device of the first embodiment.
Figure 17:
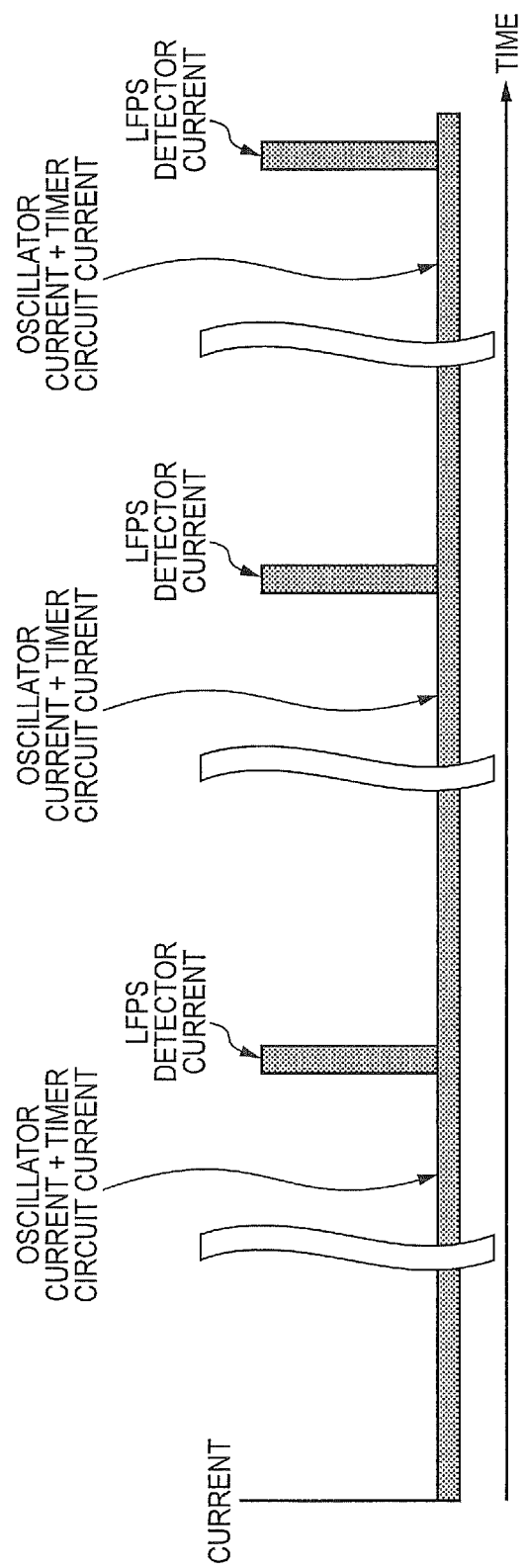
FIG. 17 is a diagram showing the circuit current quantity during intermittent operation of the semiconductor device of the first embodiment.

FIG. 16 shows the on/off (enable/disable) mode states of LFPS detector 12 and output signal for the intermittent operation control circuit 13 during intermittent operation. FIG. 17 on the other hand shows the time distribution of the circuit current. In the examples shown in FIG. 16 and FIG. 17, during intermittent operation, the LFPS detector 12 is in the operating state only one time during each of the 32 cycles of the low-speed clock signal CLK and only in the period that the low-speed clock signal CLK is high.

According to the intermittent operation, the circuit current in the LFPS detector 12 can be lowered by operating at 1/64th of the average time. When the consumption current in the LFPS detector 12 for example is 1 mA, performing intermittent operation at only 1/64th (of the average time) by way of cyclic signals from the intermittent operation control circuit 13 is capable of reducing the current consumption per that time average to 16 µA. Actually, the consumption current from the intermittent operation control circuit 13 is also added to this consumption current however the intermittent operation control circuit 13 structure can be simplified by using a CMOS circuit, so that compared to the LFPS detector 12 that requires a steady state current, the consumption current is low enough to be ignored. The effect in reducing current consumption by intermittently operating the LFPS detector 12 is therefore large. The time average of the consumption current can be adjusted by increasing or decreasing the amount of time that the LFPS detector 12 is in the operating (enable) state. The detection accuracy of the LFPS detector 12 in the intermittent operation mode is exactly the same as in normal operation mode so that a high detection accuracy can be maintained.

Second Embodiment

The semiconductor device of the second embodiment is described next while referring to the drawings. FIG. 18 is a block diagram showing the structure of the semiconductor device of the present embodiment. Referring to FIG. 18, in addition to the semiconductor device structure of the first embodiment, the semiconductor device of the present embodiment includes a register 26 for retaining the standby mode state within the link layer.

FIG. 19 is a block diagram showing an example of the structure of the intermittent operation control circuit 23 for the semiconductor device of the present embodiment. Referring to FIG. 19, the intermittent operation control circuit 23 includes a counter circuit 233 for setting an intermittent operation cycle that is different from the mode in the standby mode state (U1 mode through U3 mode).

The output from the register 26 formed within the link layer, and that holds information relating to the mode in the standby mode state, is input to the intermittent operation control circuit 23. The intermittent operation control circuit identifies by way of the state of the register output signal, which mode among the multiple standby mode state modes that the current system state is in, and utilizes the counter circuit 233 to set an optimal intermittent operation period in each standby mode state, and intermittently operates the LFPS detector 12.

FIG. 20 is an excerpt from the USB 3.0 standards, and shows the LFPS transmit timing in each mode. Referring to FIG. 20, during recovery from the standby mode state (U1 mode through U3 mode) the burst widths of the LFPS signals sent from the connection destination are listed in the table.

FIG. 21 is drawings showing an example of setting the intermittent operation cycle that is set in each standby mode state based on the timing specified in FIG. 20. The intermittent operation control circuit 23 for example sets the LFPS detector 12 to the on(enable) mode state spanning a specified period in a cycle within a range from half to the maximum burst length of the LFPS signal shown in FIG. 20, and may be set to the off (disable) mode state in all other periods.

Referring to FIG. 21, in U1 mode, the intermittent operation control circuit 23 for example sets the LFPS detector 12 to the on (enable) mode state spanning a period of 0.4 µs in the same cycle as the maximum burst length, and sets the LFPS detector 12 to off in all other periods. In the U2 mode and U3 mode however, the LFPS detector 12 is set to the on (enable) mode state spanning the 0.4 µs period in half the maximum burst length cycle and in all other periods the LFPS detector 12 is set to the off (disable) mode state.

In USB 3.0 the minimum burst length and timeout time of the LFPS signal that was input, varies depend on each standby mode state of the U1 mode through U3 modes, so that by setting an optimal intermittent operation period depend on each standby mode state, the intermittent operation can effectively lower the consumption current.

Third Embodiment

The semiconductor device of the third embodiment is described next while referring to the drawings. FIG. 22 is a block diagram showing the structure of the semiconductor device of the present embodiment. Referring to FIG. 22, an intermittent operation control device 33 of the semiconductor device is located within the link layer and not within the physical layer.

The present embodiment differs from the semiconductor device of the first embodiment shown in FIG. 6 and the semiconductor device of the second embodiment shown in FIG. 18 in the point that intermittent operation control is performed by way of signals from the intermittent operation control circuit 33 within the link layer.

The link layer contains a function to monitor the LFPS signal when the U1 mode through U3 mode is in the standby mode state. The monitor circuit operates even during U1 mode through U3 mode. Here, the operation clock is a low-speed clock signal CLK from the oscillator 14 within the physical layer. The link layer also controls the state of the physical layer so the link layer retains information relating to the current state of any of the U0 modes through U3 modes.

Forming the intermittent operation control circuit 33 within the link layer makes an exchange of control signals between the link layer and physical layer to report the states of the U0 modes through U3 modes unnecessary. The present embodiment can further execute intermittent operation based on a simple circuit configuration compared to the first embodiment and the second embodiment.

Fourth Embodiment

The semiconductor device of the fourth embodiment is described next while referring to the drawings. FIG. 23 is a block diagram showing the semiconductor device of the present embodiment. Referring to FIG. 23, the present embodiment differs from the structure (FIG. 6, FIG. 7) of the first embodiment in the point that no intermittent operation setup signals serving as control signals from the link layer are required.

In the present embodiment, the intermittent operation control circuit 43 utilizes an enable signal (PLL enable signal) for the PLL (Phase Locked Loop) circuit as the existing signal, instead of intermittent operation setup signal in FIG. 7.

The PLL operation is stopped in the U3 standby mode state so the PLL enable signal serving as the existing signal is utilized as a signal to detect U3 mode. In the U0 mode, U1 mode or the U2 mode on the other hand, the PLL enable signal is high and the LFPS detector 12 does not intermittently operate at that time.

During U3 mode, the PLL enable signal is low, so the intermittent operation control circuit 43 formed in the physical layer can recognize the U3 mode standby mode state by referring to this (PLL enable signal) and the LFPS detector 12 is intermittently operated.

The present embodiment can lower the consumption current by intermittently operating the LFPS detector 12 during the U3 mode standby mode state by utilizing the PLL enable signal serving as the existing signal in the intermittent operation mode settings, without having to add a new terminal for intermittent operation.

Fifth Embodiment

The semiconductor device of the fifth embodiment is described next while referring to the drawings. FIG. 24 is a block diagram showing the structure of the semiconductor device of the present embodiment. Referring to FIG. 24, the present embodiment is the semiconductor device of the fourth embodiment to which an intermittent operation setup signal has further been added.

In the present embodiment, adding the intermittent operation setup signal allows selecting whether to intermittently operate or not operate when in U3 mode. Referring to FIG. 24, the intermittent operation control circuit 53 receives the intermittent operation setup signal along with the PLL enable signal.

The intermittent operation control circuit 53 intermittently operates the LFPS detector 12 when the PLL enable signal is low, and when the intermittent operation setup signal is high; and in all other cases normally operates the LFPS detector 12.

In the fourth embodiment, the detector 12 is always intermittently operated when the PLL enable signal is low. In the present embodiment however, the whether to intermittently operate the LFPS detector 12 when in U3 mode can be set by way of an external setting via the intermittent operation setup signal.

Sixth Embodiment

The semiconductor device of the sixth embodiment is described next while referring to the drawings. FIG. 25 is a block diagram showing the structure of the semiconductor device of the present embodiment. Referring to FIG. 25, the present embodiment differs from the semiconductor device of the fourth embodiment in that the transmitter-receiver enable signal serving as the existing control signal is utilized as the control signal to the intermittent operation control circuit 63. In other words, in the present embodiment, the intermittent operation control circuit 63 utilizes the transmitter-receiver enable signal and the PLL enable signal which are the existing signals, instead of the intermittent operation setup signal and the standby mode setup signal utilized in the second embodiment (FIG. 18, FIG. 19).

The PLL operation is stopped in the U3 standby mode state so the PLL enable signal serving as the existing signal is utilized as a signal to detect U3 mode.

In the U1 mode, U2 mode or the U3 mode on the other hand, the transmitter-receiver circuit is stopped so the existing transmitter-receiver enable signal is utilized as the signal to detect the U3 mode.

When in U0 mode, the PLL enable signal is high and moreover the transmitter-receiver enable signal is high so that the intermittent operation control circuit 63 operates the LFPS detector 12 normally (i.e. no intermittent operation).

When in U1 mode or U2 mode on the other hand, the PLL enable signal is high, and moreover the transmitter-receiver enable signal is low so that the intermittent operation control circuit 63 intermittently operates the LFPS detector 12 at the optimal cycle in the U1 mode.

When in U3 mode, the PLL enable signal is low so that the intermittent operation control circuit 63 intermittently operates the LFPS detector 12 at the optimal cycle in U3 mode.

The present embodiment utilizes the transmitter-receiver enable signal and the PLL enable signal which are the existing signals, in the intermittent operation mode settings. The present embodiment can in this way effectively lower the consumption current by intermittent operation, by setting an optimal intermittent operation period in each mode when the U1 mode through U3 mode are in standby mode state, and without having to add a new terminal for intermittent operation.

Seventh Embodiment

The semiconductor device of the seventh embodiment is described next while referring to the drawings. FIG. 26 is a block diagram showing the structure of the semiconductor device of the present embodiment. Referring to FIG. 26, the present embodiment is the semiconductor device of the sixth embodiment to which an intermittent operation setup signal has been added.

In the present embodiment, adding the intermittent operation setup signal allows selecting whether to employ intermittent operation or not when in U1 mode through U3 mode. Referring to FIG. 26, the intermittent operation control circuit 73 receives the intermittent operation setup signal along with the PLL enable signal and the transmitter-receiver enable signal.

When the intermittent operation setup signal is high, the PLL enable signal is high and moreover the transmitter-receiver enable signal is low, the intermittent operation control circuit 73 intermittently operates the LFPS detector 12 at the optimal cycle in U1 mode.

When the intermittent operation setup signal is high and the PLL enable signal is low, the intermittent operation control circuit 73 intermittently operates the LFPS detector 12 at the optimal cycle in U3 mode.

In all other cases, the intermittent operation control circuit 73 operates the LFPS detector 12 in normal operation (i.e. no intermittent operation).

The present embodiment allows selecting whether or not to intermittently operate the LFPS detector 12 when in the U1 mode through U3 mode by setting the intermittent operation setup signal from an external unit.

Each of the disclosures in the documents of the related art such as the patent documents is incorporated by reference into this document. Modifications and adjustments of the embodiments are allowed if within the scope of the full disclosure of the present invention (including the claims) and further based on those technical concepts. Moreover, various combinations or selections of each of the various disclosed elements (including each element of each of the claims, each element of each of the embodiments, and each element of each drawing) are possible if within the range of the claims of the present invention. In other words, the present invention may of course include each type of variation and correction achievable by one skilled in the art that complies with the technical concepts and the full disclosure including the range of the claims.

What is claimed is:

1. A semiconductor device comprising:
    a detector to receive an input signal whose characteristics fluctuate according to the standby mode state, compare the amplitude of the applicable signal with a specified threshold amplitude, and outputs a detector output showing whether or not the amplitude of the applicable signal is above a specified threshold amplitude; and
    an intermittent operation control circuit that along with receiving the detector output, also receives a first signal showing which mode among the multiple modes the standby mode state is in, and sets the detector to the on (enable) mode state when the input signal is above the specified threshold amplitude, and in all other cases intermittently operates the detector according to the characteristics of the input signal in the mode shown by the applicable first signal.

2. The semiconductor device according to claim 1,
    wherein the intermittent operation control circuit sets the detector to the on (enable) mode state across a specified period in a cycle according to the maximum burst length of the input signal in the mode shown by the first signal, and sets the detector to the off mode state across all other periods.

3. The semiconductor device according to claim 2,
    wherein the intermittent operation control circuit sets the detector to the on (enable) mode state spanning a specified period in a cycle from half the maximum burst length to the applicable maximum burst length of the input signal in the mode shown by the first signal, and sets the detector to the off (disable) mode state across all other periods.

4. The semiconductor device according to claim 1, further comprising:
    an oscillator to supply clock signals,
    wherein besides dividing a clock signal to generate multiple frequency-divided clock signals, the intermittent operation control circuit generates signals for intermittently operating the detector by obtaining the logical product of the frequency-divided clock signals.

5. The semiconductor device according to claim 1,
    wherein the input signal is a LFPS (Low Frequency Periodic Signaling) signal sent from a USB (Universal Serial Bus) device.

6. The semiconductor device according to claim 5,
    wherein the detector and the intermittent operation control circuit are both formed in the physical layer.

7. The semiconductor device according to claim 5, further comprising:
    a register containing information showing which mode among the standby mode state is in,
    wherein the intermittent operation control circuit receives a first signal from the register.

8. The semiconductor device according to claim 5,
    wherein the physical layer includes the detector, and
    wherein the link layer includes the intermittent operation control circuit.

9. The semiconductor device according to claim 1,
    wherein the intermittent operation control circuit receives a second signal showing whether or not the detector circuit should be operated by normal operation or should be operated by intermittent operation, and when the input signal is above the specified threshold amplitude, or the applicable second signal shows the detector should be operated by normal operation, the detector circuit is set to the operation state, and in all other cases, the detector is set to the intermittent operation state.

10. The semiconductor device according to claim 9,
    wherein along with identifying the standby mode state based on the enable signal for the PLL circuit from the link layer instead of utilizing the first signal and the second signal, the intermittent operation control circuit decides whether or not to operate the detector by normal operation or by intermittent operation.

11. The semiconductor device according to claim 9,
    wherein the intermittent operation control circuit identifies the standby mode state based on the enable signal for the PLL circuit from the link layer, instead of utilizing the first signal.

12. The semiconductor device according to claim 9,
    wherein along with identifying the standby mode state based on the enable signal for the PLL circuit from the link layer instead of utilizing the first signal and the second signal, the intermittent operation control circuit decides whether or not to operate the detector by normal operation or by intermittent operation based on the enable signal for the transmitter-receiver circuit.

13. The semiconductor device according to claim 9,
    wherein the intermittent operation control circuit identifies the standby mode state based on the enable signal for the PLL circuit and the enable signal for the transmitter-receiver circuit from the link layer instead of utilizing the first signal.

14. The control method for a semiconductor device comprising:
    comparing the amplitude of an input signal whose characteristics fluctuate according to the standby mode state with a specified threshold amplitude, and deciding by way of the detector whether or not the amplitude of the applicable input signal is above a specified threshold amplitude;

receiving a first signal showing which mode among the standby mode state is in; and after the steps above, setting the detector to the on (enable) mode state when the input signal is above the specified threshold amplitude, and in all other cases intermittently operating the detector depend on the characteristics of the input signal in the mode shown by the first signal.

15. The control method for a semiconductor device according to claim 14 comprising:

setting the detector to the on (enable) mode state spanning a specified period in a cycle according to the maximum burst length of the input signal in the mode shown by the first signal, and setting the detector to the off (disable) mode state spanning all other periods.

16. The control method for a semiconductor device according to claim 15, comprising:

setting the detector to the on (enable) mode state spanning a specified period in a cycle from half the maximum burst length to the maximum burst length of the input signal in the mode shown by the first signal, and setting the detector to the off (disable) mode state spanning all other periods.

* * * * *